(12) United States Patent
Gagner et al.

(10) Patent No.: US 9,086,732 B2
(45) Date of Patent: Jul. 21, 2015

(54) GESTURE FUSION

(71) Applicant: WMS Gaming Inc., Waukegan, IL (US)

(72) Inventors: Mark B. Gagner, West Chicago, IL (US); Sean Kelly, Skokie, IL (US); Scott A. Massing, Lincolnwood, IL (US); Larry J. Pacey, Chicago, IL (US); Jesse Smith, Chicago, IL (US); Muthu Velu, Schaumburg, IL (US)

(73) Assignee: WMS Gaming Inc., Waukegan, IL (US)

( * ) Notice: Subject to any disclaimer, the term of this patent is extended or adjusted under 35 U.S.C. 154(b) by 118 days.

(21) Appl. No.: 13/755,856

(22) Filed: Jan. 31, 2013

(65) Prior Publication Data

US 2013/0296057 A1 Nov. 7, 2013

Related U.S. Application Data

(60) Provisional application No. 61/641,951, filed on May 3, 2012.

(51) Int. Cl.
*G06F 19/00* (2011.01)
*G06F 3/01* (2006.01)
*A63F 13/2145* (2014.01)
(Continued)

(52) U.S. Cl.
CPC ............... *G06F 3/017* (2013.01); *A63F 13/00* (2013.01); *A63F 13/2145* (2014.09); *G06F 3/0304* (2013.01); *G06F 3/04883* (2013.01)

(58) Field of Classification Search
CPC ..... G07F 17/32; G07F 17/3209; A63F 13/06; A63F 13/2145
See application file for complete search history.

(56) References Cited

U.S. PATENT DOCUMENTS

| 3,533,628 A | 10/1970 | Fisher |
| 4,357,488 A | 11/1982 | Knighton et al. |

(Continued)

FOREIGN PATENT DOCUMENTS

| AU | 1999-43487 | 3/2000 |
| EP | 309946 | 4/1989 |

(Continued)

OTHER PUBLICATIONS

The Sensor Frame Graphic Manipulator Final Report (Sensor Frame) 28 pages; (printed on Feb. 6, 2009).

(Continued)

*Primary Examiner* — Jay Liddle
*Assistant Examiner* — Alex F. R. P. Rada, II
(74) *Attorney, Agent, or Firm* — Nixon Peabody LLP

(57) ABSTRACT

"Fusion" gestures that transition from air to surface or surface to air and interactions with graphical objects displayed on one or more display devices. Surface-to-air gestures are captured on a surface of a touch-based sensing device, and the gesture leaves the surface and enters a volumetric space adjacent to the surface, where a 3D gesture sensing system captures the gesture in 3D space. One or more objects displayed on the display device(s) are graphically shown to be manipulated by the gesture. Air-to-surface gestures are captured in the reverse manner. Different devices housed in separate housings can detect the different types of gestures. For example, a gaming terminal can detect surface gestures made on a single- or multi-touch sensitive surface while a portable electronic device in communication with the gaming terminal can detect air gestures made in a volumetric space in front of the gaming terminal.

32 Claims, 24 Drawing Sheets

(51) Int. Cl.
*A63F 13/00* (2014.01)
*G06F 3/03* (2006.01)
*G06F 3/0488* (2013.01)

(56) References Cited

U.S. PATENT DOCUMENTS

| | | | |
|---|---|---|---|
| 4,484,179 A | 11/1984 | Kasday | |
| 4,522,399 A | 6/1985 | Nishikawa | |
| 4,715,004 A | 12/1987 | Kabasawa et al. | |
| 4,746,770 A | 5/1988 | McAvinney | |
| 4,763,278 A | 8/1988 | Rajasekaran et al. | |
| 4,844,475 A | 7/1989 | Saffer et al. | |
| 4,968,877 A | 11/1990 | McAvinney et al. | |
| 5,133,017 A | 7/1992 | Cain et al. | |
| 5,186,460 A | 2/1993 | Fongeallaz et al. | |
| 5,259,613 A | 11/1993 | Marnell, II | |
| 5,318,298 A | 6/1994 | Kelly et al. | |
| 5,370,399 A | 12/1994 | Liverance | |
| 5,444,786 A | 8/1995 | Raviv | |
| 5,469,193 A | 11/1995 | Giobbi et al. | |
| 5,469,510 A | 11/1995 | Blind et al. | |
| 5,511,148 A | 4/1996 | Wellner | |
| 5,524,888 A | 6/1996 | Heidel | |
| 5,533,727 A | 7/1996 | DeMar | |
| 5,542,669 A | 8/1996 | Charron et al. | |
| 5,589,856 A | 12/1996 | Stein et al. | |
| 5,655,961 A | 8/1997 | Acres et al. | |
| 5,695,188 A | 12/1997 | Ishibashi | |
| 5,704,836 A | 1/1998 | Norton et al. | |
| 5,743,798 A | 4/1998 | Adams et al. | |
| 5,762,552 A | 6/1998 | Vuong et al. | |
| 5,770,533 A | 6/1998 | Franchi | |
| 5,775,993 A | 7/1998 | Fentz et al. | |
| 5,803,810 A | 9/1998 | Norton et al. | |
| 5,807,177 A | 9/1998 | Takemoto et al. | |
| 5,808,567 A | 9/1998 | McCloud | |
| 5,816,918 A | 10/1998 | Kelly et al. | |
| 5,828,768 A | 10/1998 | Eatwell et al. | |
| 5,833,538 A | 11/1998 | Weiss | |
| 5,851,148 A | 12/1998 | Brune et al. | |
| 5,896,126 A | 4/1999 | Shieh | |
| 5,941,773 A | 8/1999 | Harlick | |
| 5,943,043 A | 8/1999 | Furuhata et al. | |
| 5,946,658 A | 8/1999 | Miyazawa et al. | |
| 5,971,850 A | 10/1999 | Liverance | |
| 5,976,019 A | 11/1999 | Ikeda et al. | |
| 6,067,112 A | 5/2000 | Wellner et al. | |
| 6,068,552 A | 5/2000 | Walker et al. | |
| 6,089,663 A | 7/2000 | Hill | |
| 6,110,041 A | 8/2000 | Walker et al. | |
| 6,162,121 A | 12/2000 | Morro et al. | |
| 6,210,167 B1 | 4/2001 | Nishiyama | |
| 6,217,448 B1 | 4/2001 | Olsen | |
| 6,246,395 B1 | 6/2001 | Goyins et al. | |
| 6,254,483 B1 | 7/2001 | Acres | |
| 6,255,604 B1 | 7/2001 | Tokioka et al. | |
| 6,283,860 B1 | 9/2001 | Lyons et al. | |
| 6,302,790 B1 | 10/2001 | Brossard | |
| 6,308,953 B1 | 10/2001 | Nagano | |
| 6,315,666 B1 | 11/2001 | Mastera et al. | |
| 6,364,314 B1 | 4/2002 | Canterbury | |
| 6,416,411 B1 | 7/2002 | Tsukahara | |
| 6,422,941 B1 | 7/2002 | Thorner et al. | |
| 6,471,589 B1 | 10/2002 | Nagano | |
| 6,530,842 B1 | 3/2003 | Wells et al. | |
| 6,561,908 B1 | 5/2003 | Hoke | |
| 6,607,443 B1 | 8/2003 | Miyamoto et al. | |
| 6,620,045 B2 | 9/2003 | Berman et al. | |
| 6,638,169 B2 | 10/2003 | Wilder et al. | |
| 6,642,917 B1 | 11/2003 | Koyama et al. | |
| 6,676,514 B1 | 1/2004 | Kusuda et al. | |
| 6,677,932 B1 | 1/2004 | Westerman | |
| 6,767,282 B2 | 7/2004 | Matsuyama et al. | |
| 6,788,295 B1 | 9/2004 | Inkster | |
| 6,819,312 B2 | 11/2004 | Fish | |
| 6,856,259 B1 | 2/2005 | Sharp | |
| 6,929,543 B1 | 8/2005 | Ueshima et al. | |
| 6,932,706 B1 * | 8/2005 | Kaminkow | 463/36 |
| 6,942,571 B1 | 9/2005 | Mcallister et al. | |
| 6,995,752 B2 | 2/2006 | Lu | |
| 7,077,009 B2 | 7/2006 | Lokhorst et al. | |
| 7,204,428 B2 | 4/2007 | Wilson | |
| 7,254,775 B2 | 8/2007 | Geaghan et al. | |
| 7,294,059 B2 | 11/2007 | Silva et al. | |
| 7,331,868 B2 | 2/2008 | Beaulieu et al. | |
| RE40,153 E | 3/2008 | Westerman et al. | |
| 7,379,562 B2 | 5/2008 | Wilson | |
| 7,397,464 B1 | 7/2008 | Robbins et al. | |
| 7,411,575 B2 | 8/2008 | Hill et al. | |
| 7,479,065 B1 | 1/2009 | McAllister et al. | |
| 7,479,949 B2 | 1/2009 | Jobs et al. | |
| 7,936,341 B2 | 5/2011 | Weiss | |
| 8,062,115 B2 | 11/2011 | Thomas et al. | |
| 8,147,316 B2 | 4/2012 | Arezina et al. | |
| 8,235,789 B2 | 8/2012 | Rasmussen | |
| 8,821,286 B2 * | 9/2014 | Gagner et al. | 463/39 |
| 2002/0003919 A1 | 1/2002 | Morimoto | |
| 2002/0013173 A1 | 1/2002 | Walker et al. | |
| 2002/0037763 A1 | 3/2002 | Idaka | |
| 2002/0090990 A1 | 7/2002 | Joshi et al. | |
| 2002/0097223 A1 | 7/2002 | Rosenberg | |
| 2002/0142825 A1 | 10/2002 | Lark et al. | |
| 2002/0142846 A1 | 10/2002 | Paulsen | |
| 2002/0151349 A1 | 10/2002 | Joshi | |
| 2002/0173354 A1 | 11/2002 | Winans et al. | |
| 2003/0054881 A1 | 3/2003 | Hedrick et al. | |
| 2003/0067447 A1 | 4/2003 | Geaghan et al. | |
| 2003/0114214 A1 | 6/2003 | Barahona et al. | |
| 2004/0001048 A1 | 1/2004 | Kraus et al. | |
| 2004/0029636 A1 | 2/2004 | Wells | |
| 2004/0029637 A1 | 2/2004 | Hein, Jr. et al. | |
| 2004/0038721 A1 | 2/2004 | Wells | |
| 2004/0053695 A1 | 3/2004 | Mattice et al. | |
| 2004/0063482 A1 | 4/2004 | Toyoda | |
| 2004/0166930 A1 | 8/2004 | Beaulieu et al. | |
| 2004/0166937 A1 * | 8/2004 | Rothschild et al. | 463/36 |
| 2004/0193413 A1 * | 9/2004 | Wilson et al. | 704/243 |
| 2005/0059458 A1 | 3/2005 | Grisld et al. | |
| 2005/0113163 A1 | 5/2005 | Mattice et al. | |
| 2005/0227217 A1 | 10/2005 | Wilson | |
| 2005/0259378 A1 | 11/2005 | Hill et al. | |
| 2006/0001652 A1 | 1/2006 | Chiu et al. | |
| 2006/0010400 A1 | 1/2006 | Dehlin et al. | |
| 2006/0025194 A1 | 2/2006 | McInerny et al. | |
| 2006/0026521 A1 | 2/2006 | Hotelling et al. | |
| 2006/0026536 A1 | 2/2006 | Hotelling et al. | |
| 2006/0031786 A1 | 2/2006 | Hillis et al. | |
| 2006/0033724 A1 | 2/2006 | Chaudhri et al. | |
| 2006/0073891 A1 | 4/2006 | Holt | |
| 2006/0101354 A1 | 5/2006 | Hashimoto et al. | |
| 2006/0164399 A1 | 7/2006 | Cheston et al. | |
| 2006/0178205 A1 | 8/2006 | Bleich et al. | |
| 2006/0284874 A1 | 12/2006 | Wilson | |
| 2006/0294247 A1 | 12/2006 | Hinckley et al. | |
| 2007/0093290 A1 | 4/2007 | Winans et al. | |
| 2007/0124370 A1 | 5/2007 | Nareddy et al. | |
| 2007/0152984 A1 | 7/2007 | Ording et al. | |
| 2007/0177803 A1 | 8/2007 | Elias et al. | |
| 2007/0201863 A1 | 8/2007 | Wilson et al. | |
| 2007/0236478 A1 | 10/2007 | Geaghan et al. | |
| 2007/0247435 A1 | 10/2007 | Benko et al. | |
| 2007/0259717 A1 * | 11/2007 | Mattice et al. | 463/36 |
| 2007/0270203 A1 | 11/2007 | Aida | |
| 2008/0076506 A1 | 3/2008 | Nguyen et al. | |
| 2008/0158145 A1 | 7/2008 | Westerman | |
| 2008/0158146 A1 | 7/2008 | Westerman | |
| 2008/0158147 A1 | 7/2008 | Westerman et al. | |
| 2008/0158168 A1 | 7/2008 | Westerman et al. | |
| 2008/0158169 A1 | 7/2008 | O'Connor et al. | |
| 2008/0158174 A1 | 7/2008 | Land et al. | |
| 2008/0163130 A1 | 7/2008 | Westerman | |
| 2008/0180654 A1 | 7/2008 | Bathiche et al. | |
| 2008/0211766 A1 | 9/2008 | Westerman et al. | |
| 2008/0231611 A1 | 9/2008 | Bathiche et al. | |

(56) References Cited

U.S. PATENT DOCUMENTS

| | | | |
|---|---|---|---|
| 2008/0309631 | A1 | 12/2008 | Westerman et al. |
| 2008/0309634 | A1 | 12/2008 | Hotelling et al. |
| 2009/0002327 | A1 | 1/2009 | Wilson et al. |
| 2009/0002344 | A1 | 1/2009 | Wilson et al. |
| 2009/0021489 | A1 | 1/2009 | Westerman et al. |
| 2009/0118001 | A1 | 5/2009 | Kelly et al. |
| 2009/0118006 | A1 | 5/2009 | Kelly et al. |
| 2009/0143141 | A1 | 6/2009 | Wells et al. |
| 2009/0191946 | A1 | 7/2009 | Thomas et al. |
| 2009/0197676 | A1 | 8/2009 | Baerlocher et al. |
| 2009/0325691 | A1 | 12/2009 | Loose |
| 2010/0124967 | A1 | 5/2010 | Lutnick et al. |
| 2010/0130280 | A1 | 5/2010 | Arezina et al. |
| 2010/0234094 | A1* | 9/2010 | Gagner et al. .............. 463/20 |
| 2013/0084984 | A1* | 4/2013 | Gagner et al. .............. 463/39 |
| 2013/0274016 | A1* | 10/2013 | Gagner et al. .............. 463/34 |

FOREIGN PATENT DOCUMENTS

| | | |
|---|---|---|
| JP | 12-69120 | 10/1989 |
| JP | 5-31254 | 2/1993 |
| JP | 8-083144 | 3/1996 |
| JP | 8-190453 | 7/1996 |
| JP | 8-241161 | 9/1996 |
| JP | 10-277213 | 10/1998 |
| JP | 2000/010733 | 1/2000 |
| WO | 97/30416 | 8/1997 |
| WO | 99/19855 | 4/1999 |
| WO | 01/05477 | 1/2001 |
| WO | 01/33905 | 5/2001 |
| WO | 02/24288 | 3/2002 |
| WO | 02/40921 | 5/2002 |
| WO | 2006/020305 | 2/2006 |
| WO | 2007/003928 | 1/2007 |
| WO | 2008/095132 | 10/2008 |
| WO | 2008/017077 | 12/2008 |
| WO | 2009/062153 | 5/2009 |

OTHER PUBLICATIONS

The Design of a GUI Paradigm based on Tablets, T-Hands, and Transparency; Gordon Kurtenbach, George Fitmaurice, Thomas Baudel, and Bill Buxton; 8 pages; (printed on Feb. 6, 2009).

SmartSkin: An Infrastructure for Freehand Manipulation on Interactive Surfaces, by Jun Rekimoto, Interaction Laboratory; 8 pages; (printed on Feb. 6, 2009).

Single-Handed Interaction Techniques for Multiple Pressure-Sensitive Strips by Gébor Blaskó, Steven Feiner; 4 pages; (printed on Feb. 6, 2009).

A Multi-finger Interface for Performance Animation of Deformable Drawings; Tomer Moscovich, Takeo Igarashi, Jun Rekimoto, Kentaro Fukuchi, John F. Hughes; 2 pages; (printed on Feb. 6, 2009).

Precise Selection Techniques for Multi-Touch Screens; Hrvoje Benko and Andrew D. Wilson and Patrick Baudisch; 10 pages; (printed on Feb. 6, 2009).

ThinSight: Versatile Multi-touch Sensing for Thin Form-factor Displays; Steve Hodges, Shahram Izadi, Alex Butler, Alban Rrustemi and Bill Buxton; 10 pages; (printed on Feb. 6, 2009).

Web pages printed from http://multi-touchscreen.com/microsoft-surface-video-multi-touch-jeff-han-apple-bill-gates.html; (downloaded Aug. 24, 2009); 7 pages.

Web pages printed from http://www.jazzmutant.com/lumur__overview.php; (downloaded Aug. 24, 2009); 2 pages.

Web pages printed from http://www.merl.com/projects/DiamondTouch; (downloaded Aug. 24, 2009); 5 pages.

Web pages printed from http://www.merl.com/projects/?proj__area=Off+the+Desktop+Interaction+and+Dis; (Downloaded Aug. 24, 2009); 1 page.

Web pages printed from http://www.merl.com/projects/diamondspin/; (Downloaded Aug. 24, 2009); 2 pages.

Web pages printed from http://kioskmarketplace.com/article.php?id=12284&na=1; (Downloaded Aug. 25, 2009); 5 pages.

An Overview of Optical-Touch Technologies; Ian Maxwell; 5 pages; (dated Dec. 2007).

Freescale Semiconductor, E-field Keyboard Designs, Michael Steffen; 6 pages; (dated Sep. 2007).

Texas Instruments, PCB-Based Capacitive Touch Sensing with MSP430; Zack Albus; 25 pages; (dated Jun. 2007—Revised Oct. 2007).

Planet Analog, The art of capacitive touch sensing; Mark Lee, Cypress Semiconductor Corp.; 5 pages; (dated Mar. 1, 2006).

Weinert, Joe, Entertainment Vehicles, IGWB New '97 Games, pp. 11, 12 and 15-18 (Mar. 1997).

http://www.mrl.nyu.edu/~jhan/ftirsense/index.html; 2 pages, (downloaded Oct. 7, 2008).

http://ds.advancemn.com/article.php?artid=3395;3 pages (downloaded Oct. 7, 2008).

http://us.gizmodo.com/gadgets/portable-media/apple-touchscreen-patent-documentation-154248.php; 11 pages (downloaded Oct. 7, 2008).

http://loop.rldofapple.com/archives/2006/02/08/multi-touch-interaction-video/; 19 pages, (downloaded Oct. 7, 2008).

http://www.pcmag.com/article2/0,1895,1918674,00.asp; 4 pages, (downloaded Oct. 7, 2008).

Written Opinion corresponding to co-pending International Patent Application Serial No. PCT/US2007/021625, United States Patent Office, dated Sep. 15, 2008, 3 pages.

International Search Report corresponding to co-pending International Patent Application Serial No. PCT/US2007/021625, United States Patent Office, dated Sep. 15, 2008, 1 pages.

Written Opinion corresponding to co-pending International Patent Application Serial No. PCT/US2007/010048, United States Patent Office, dated Jun. 10, 2008, 3 pages.

International Search Report corresponding to co-pending International Patent Application Serial No. PCT/US2007/010048, United States Patent Office, dated Jun. 10, 2008, 2 pages.

* cited by examiner

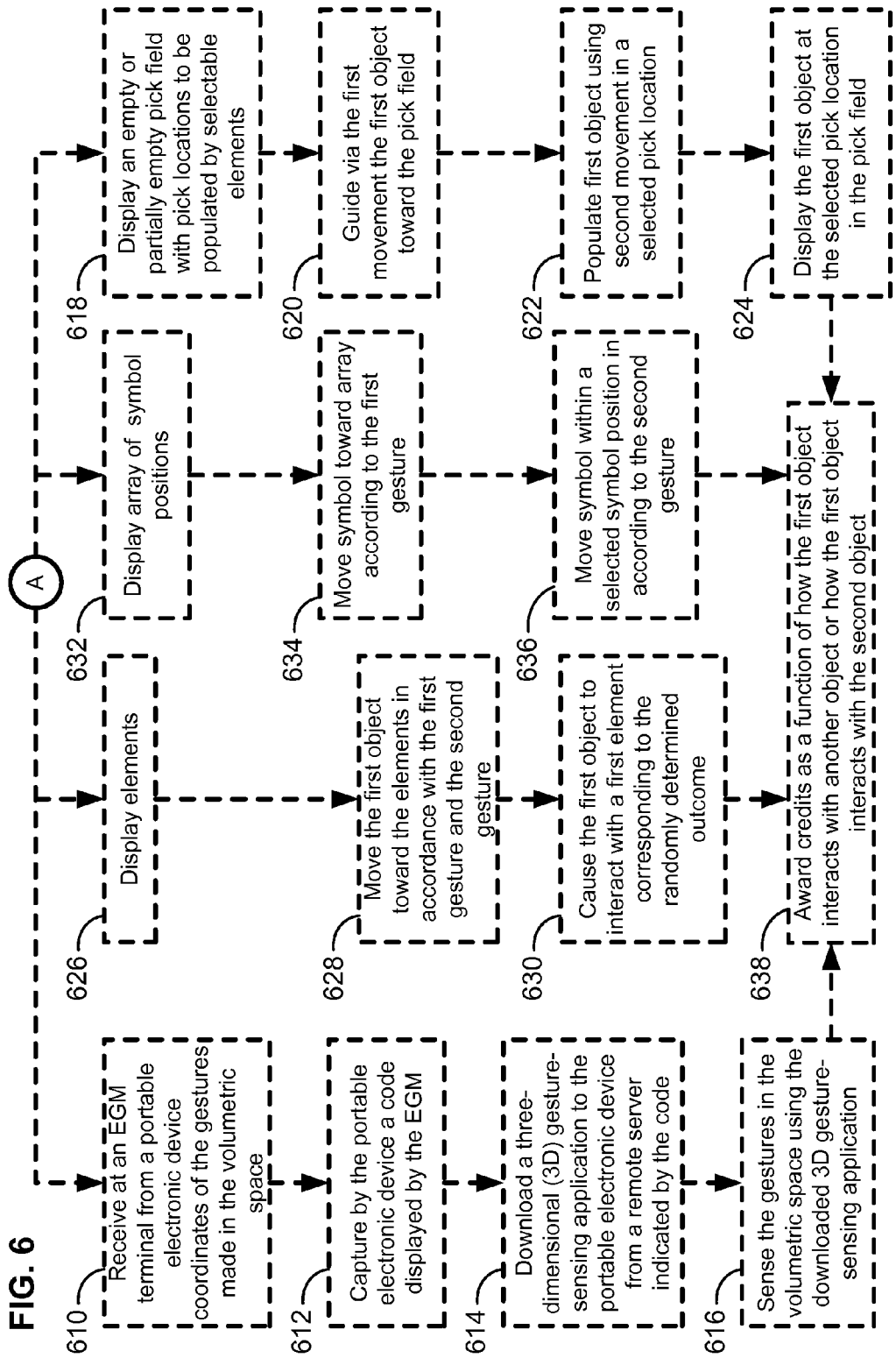

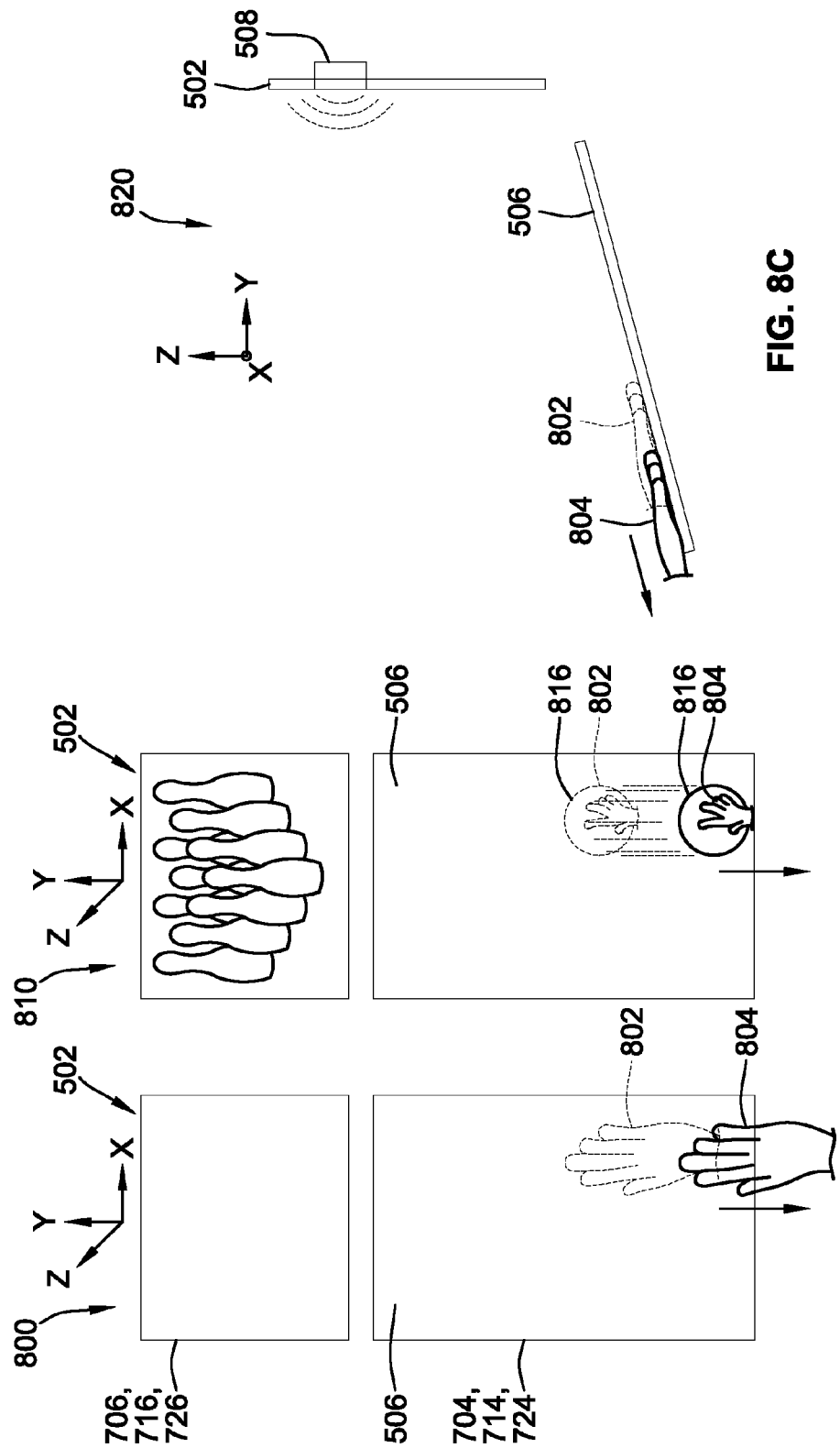

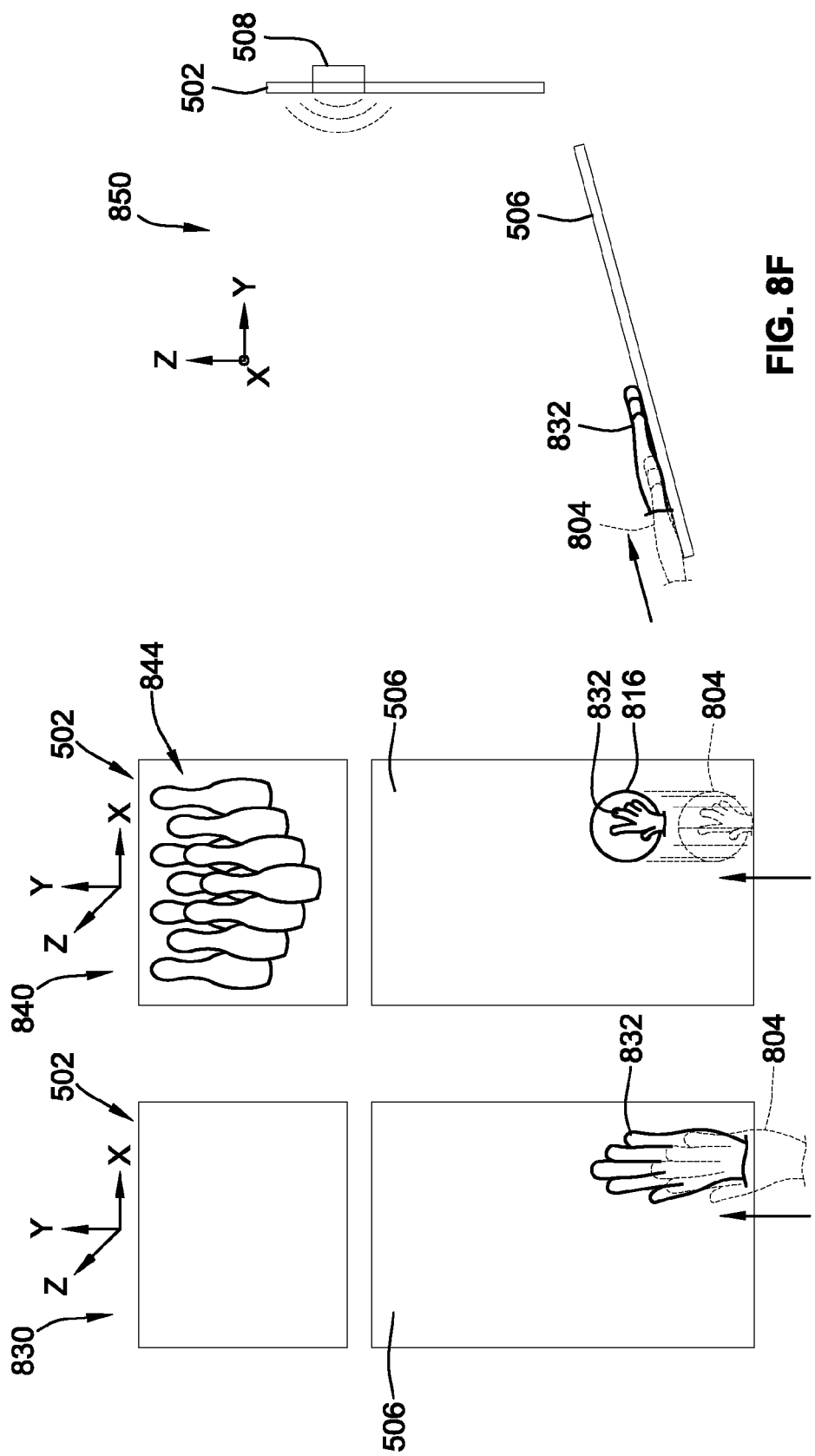

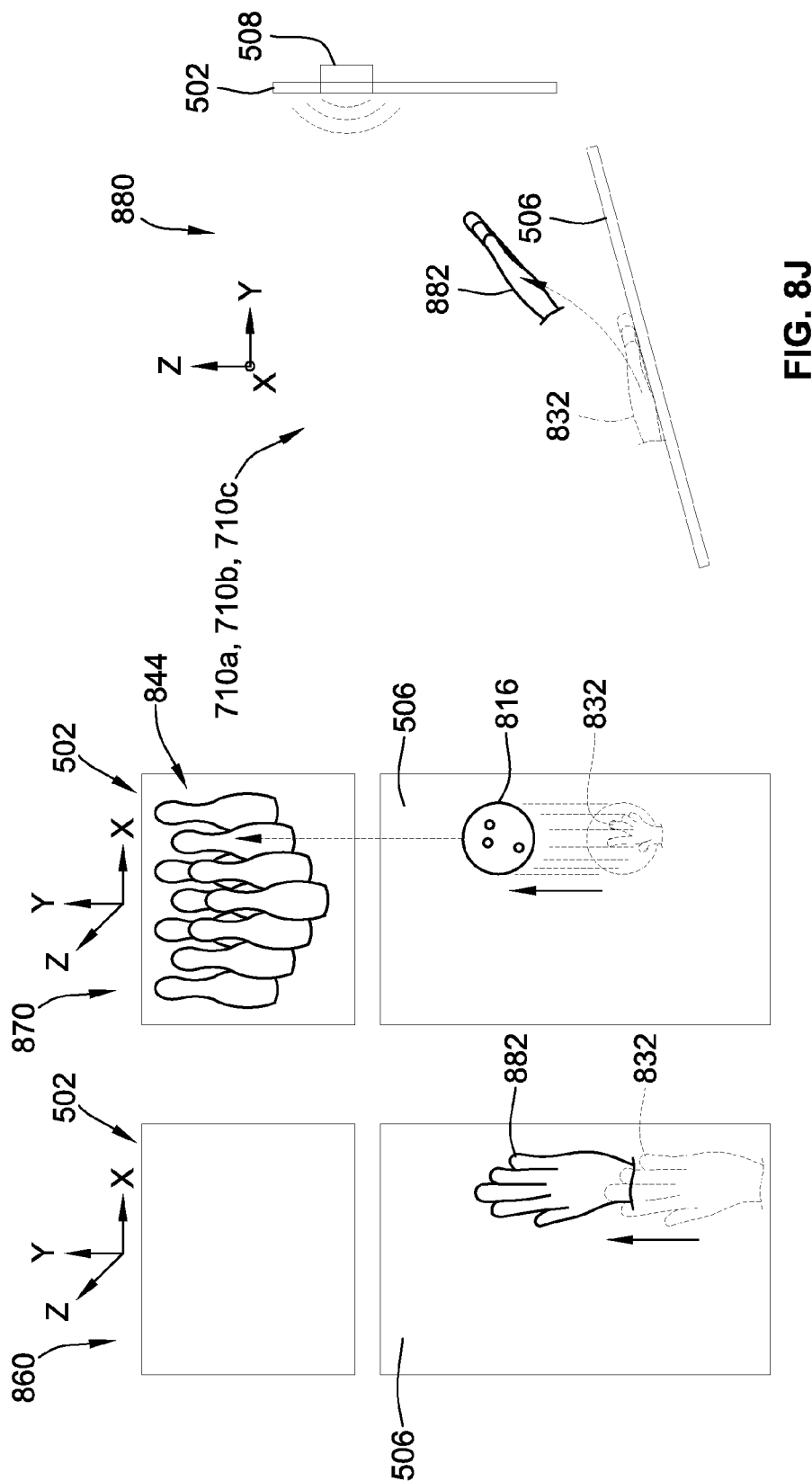

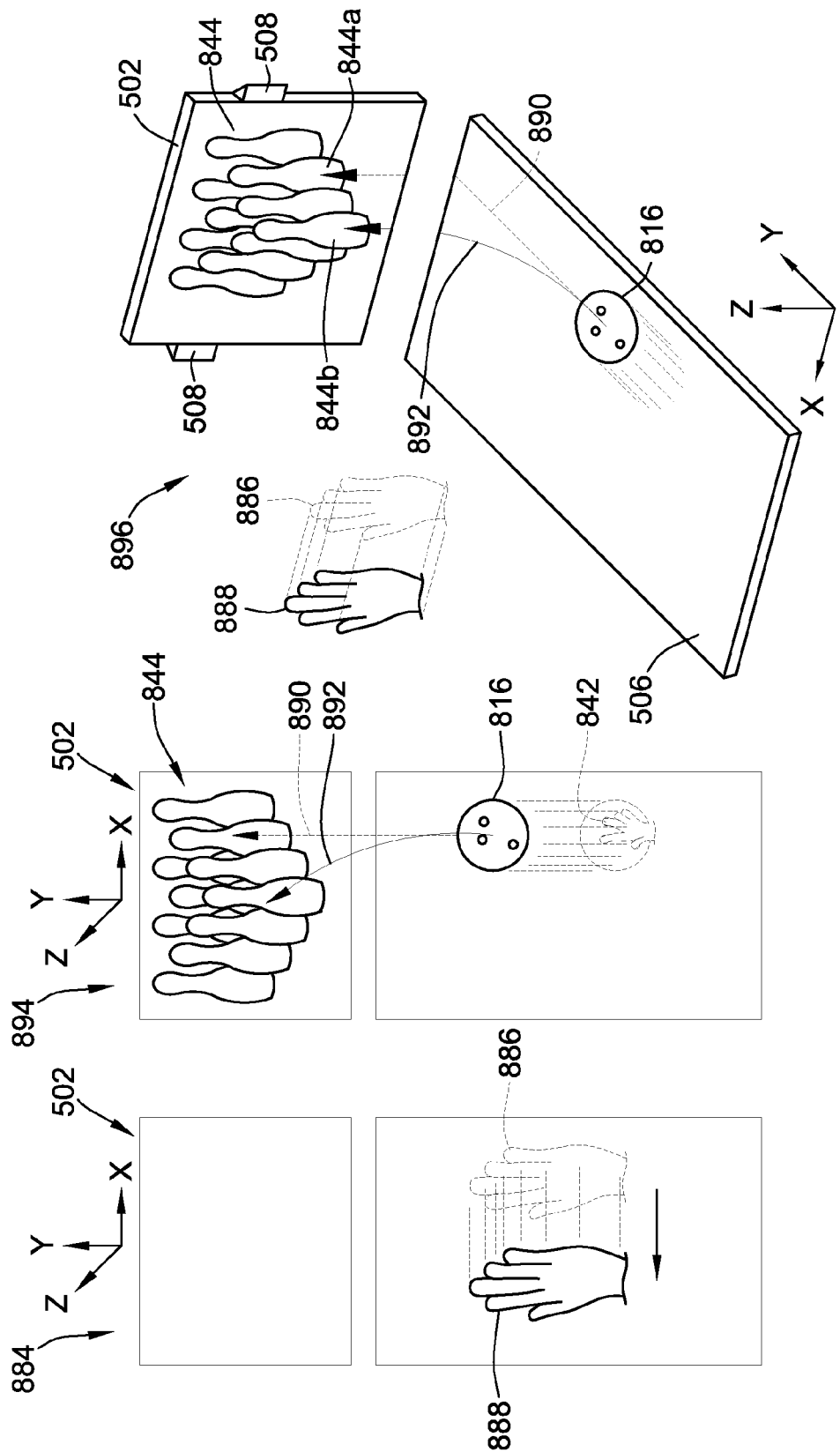

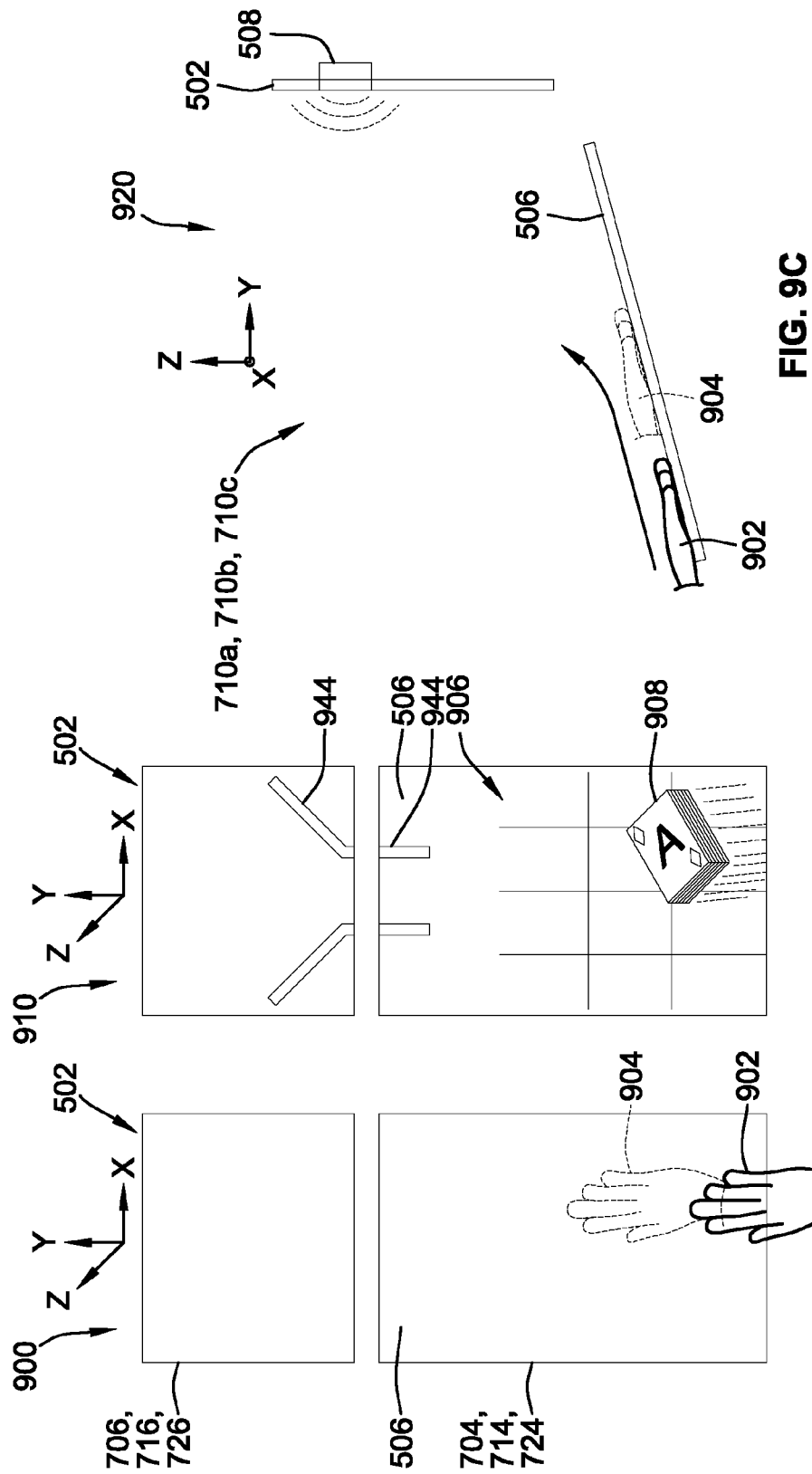

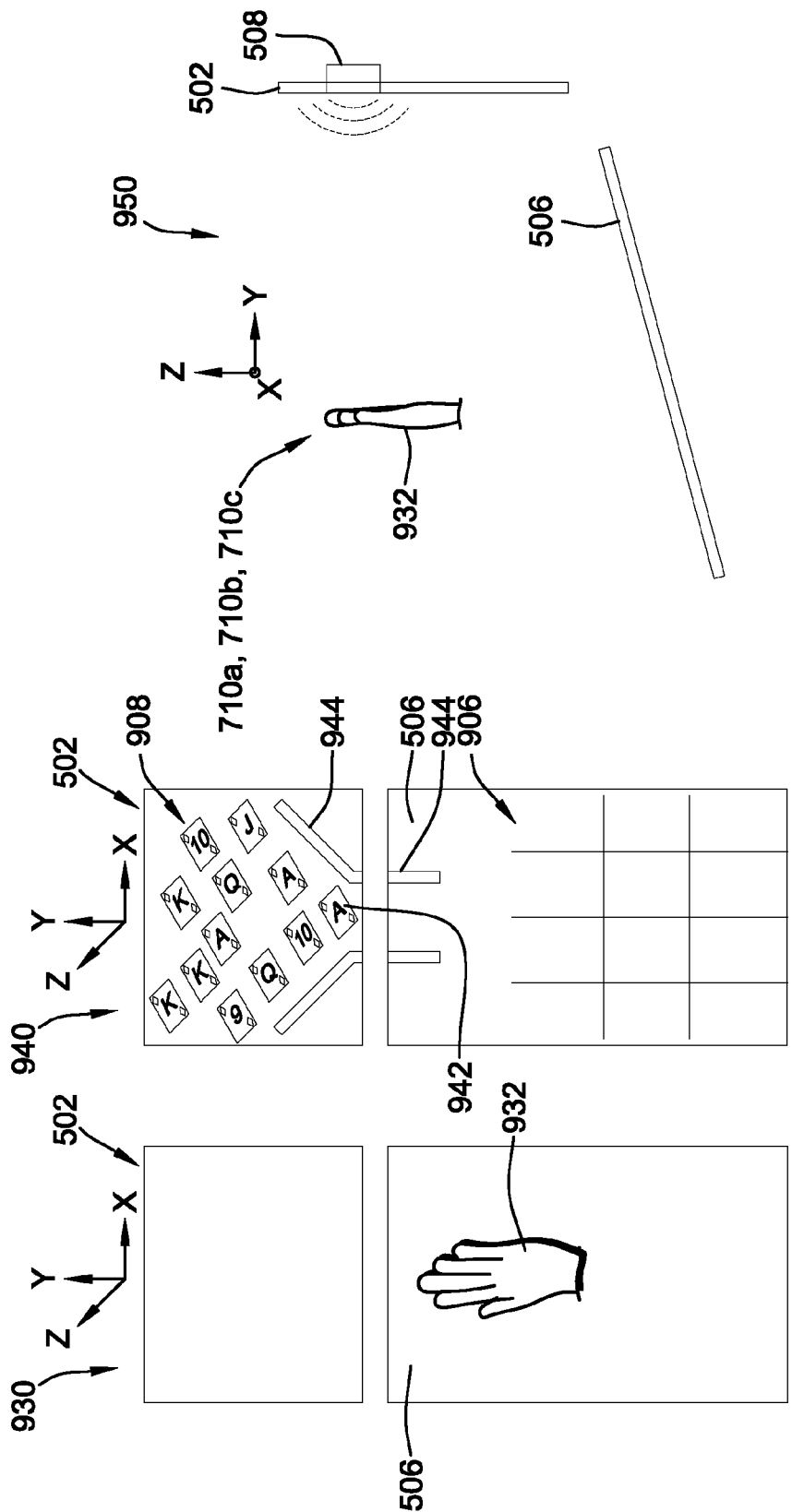

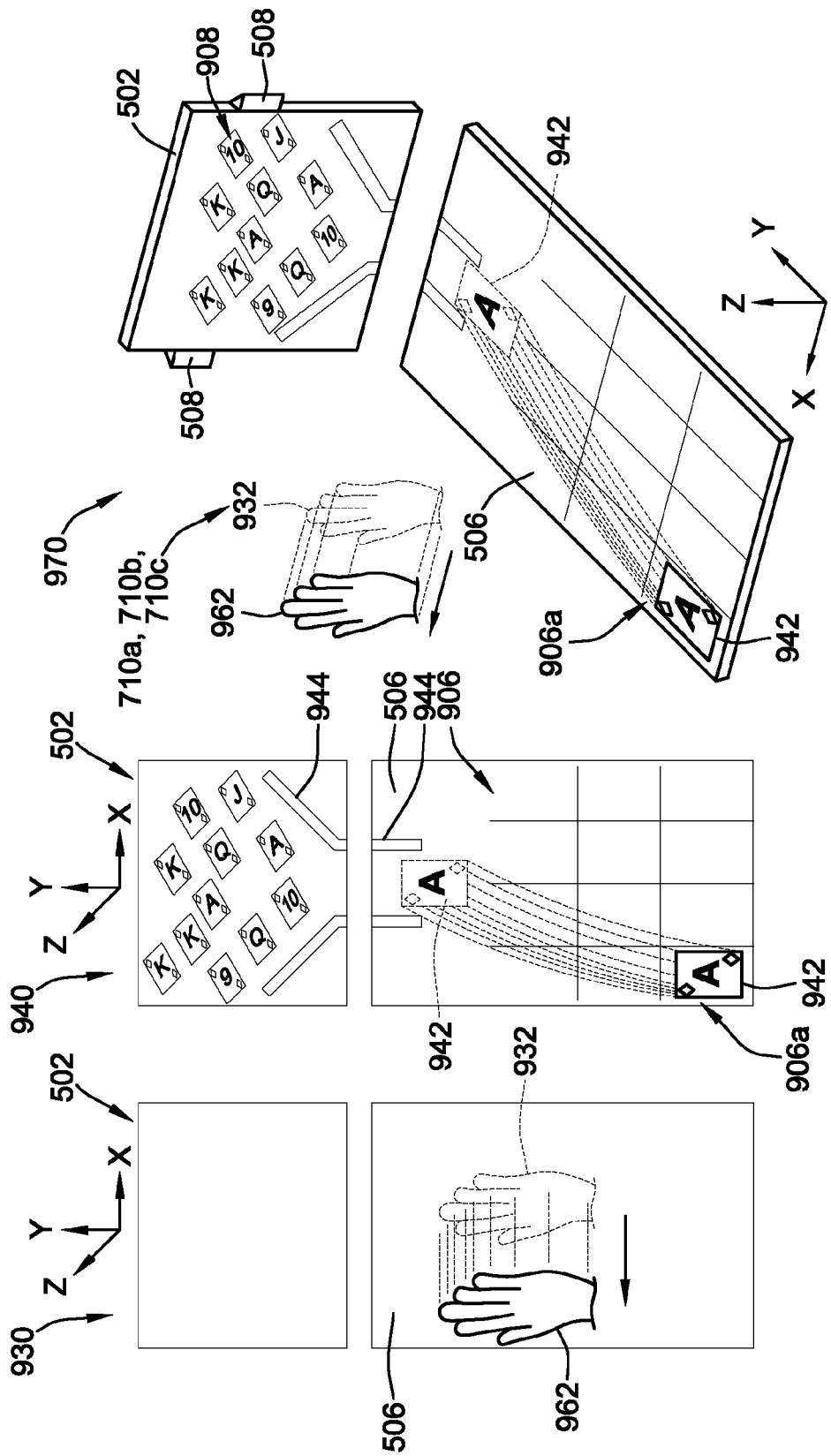

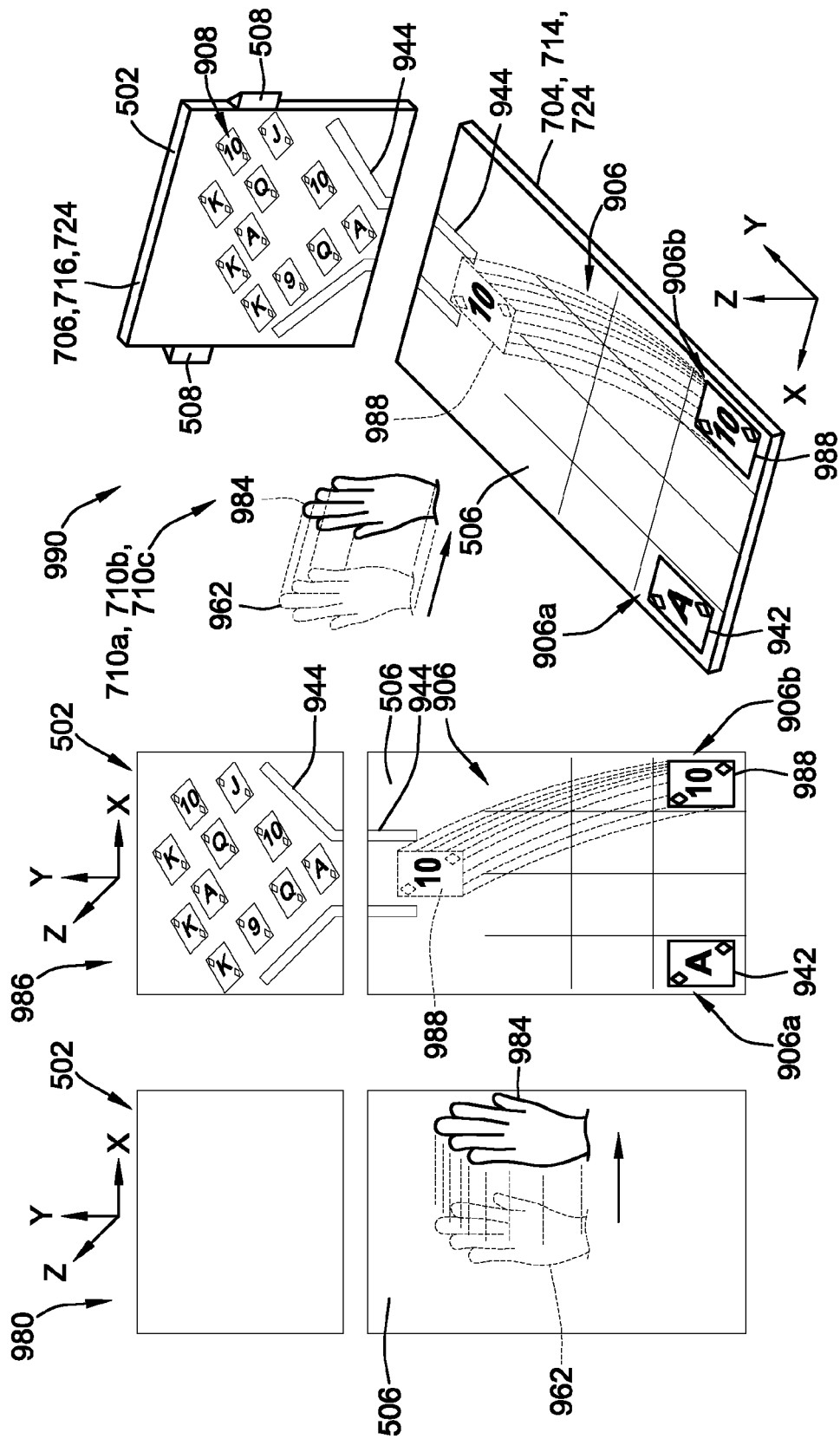

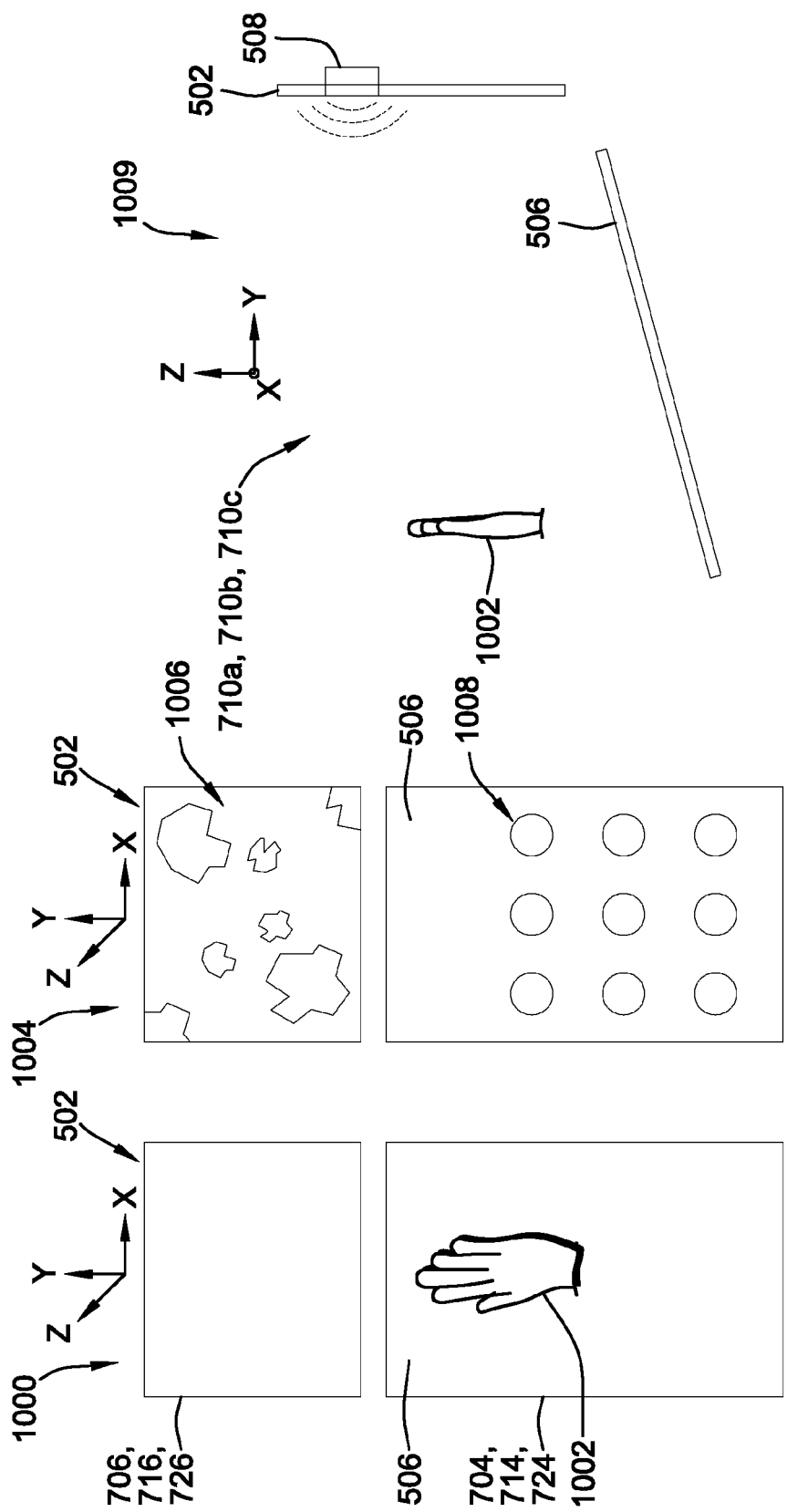

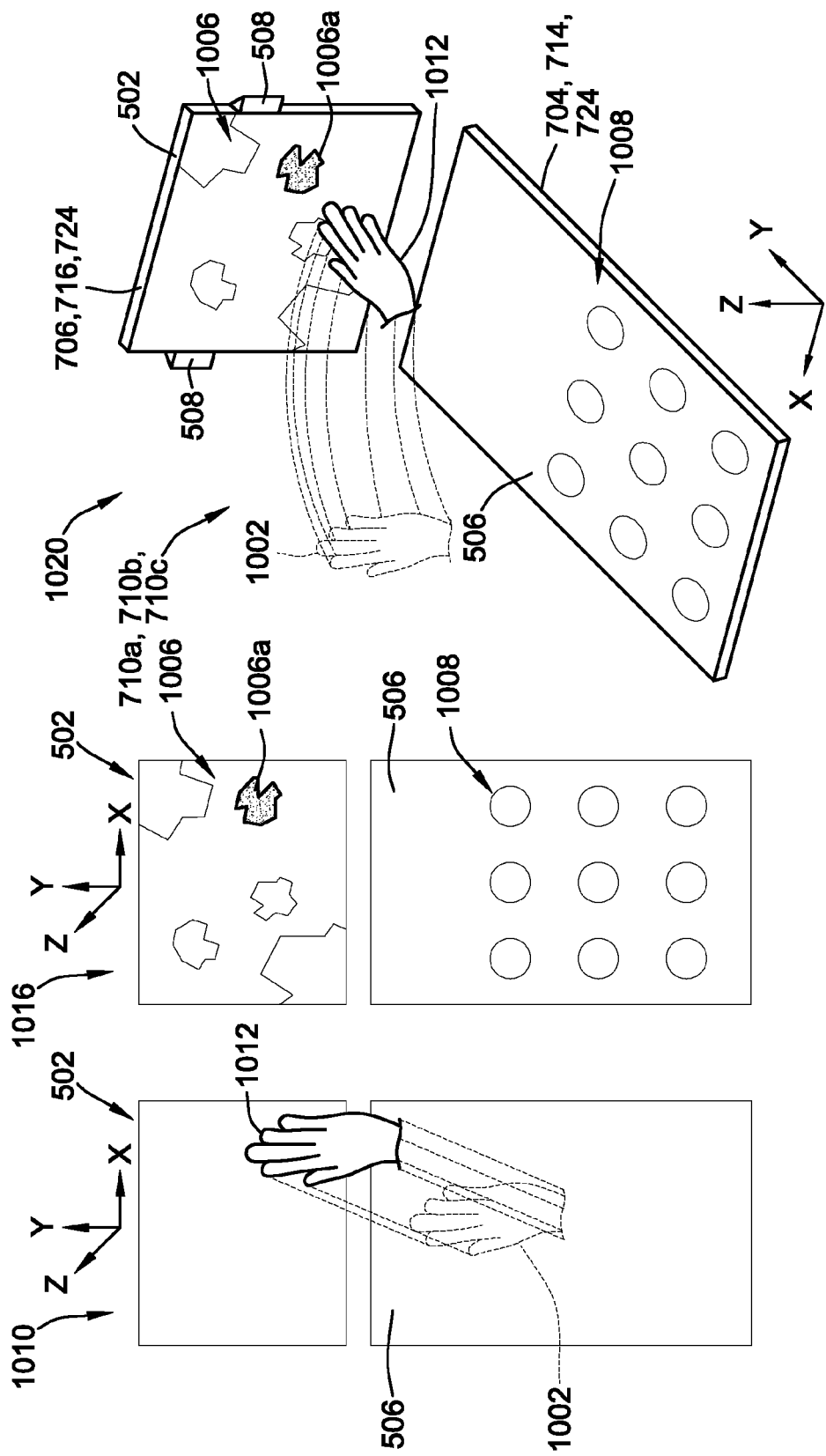

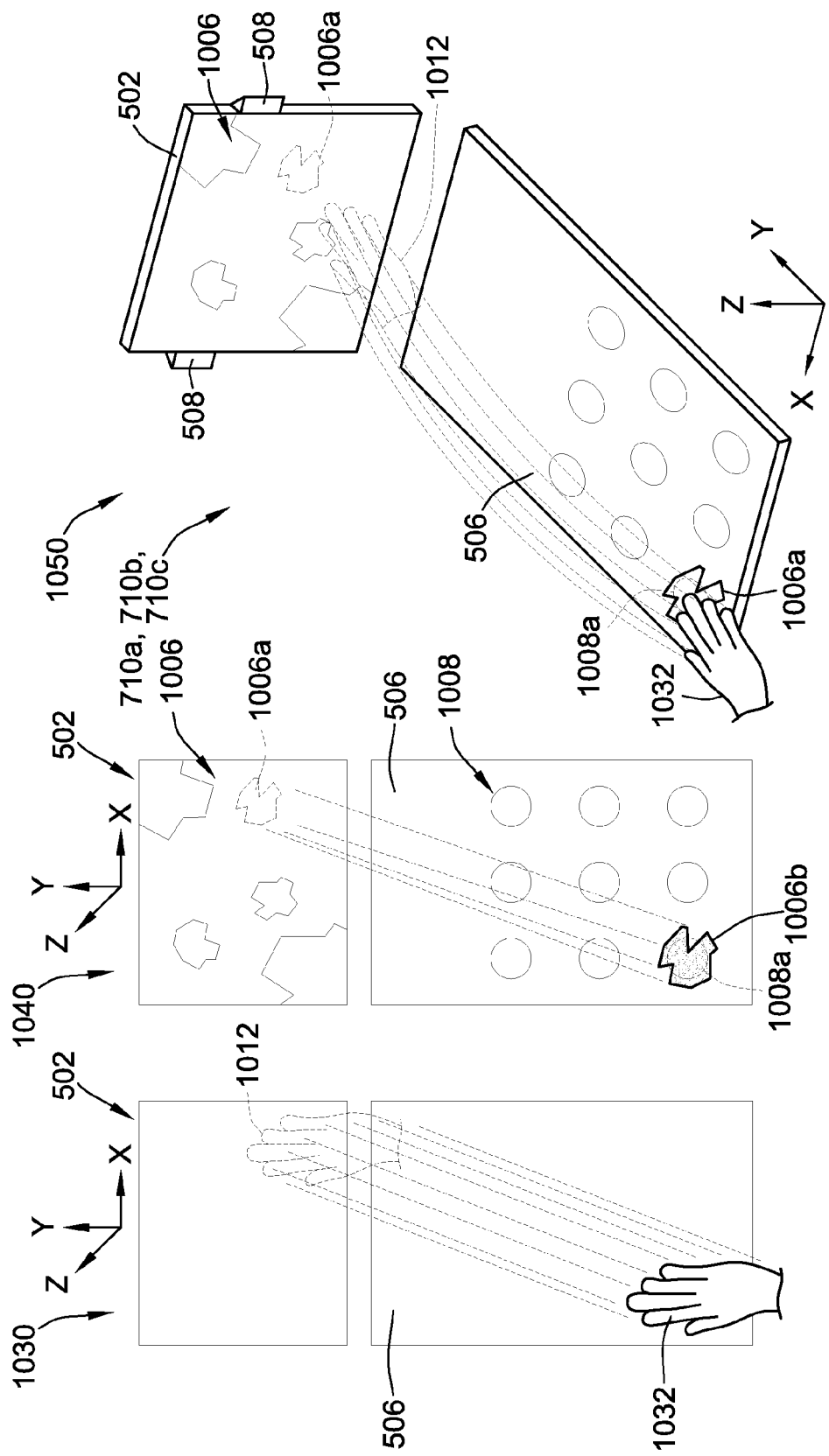

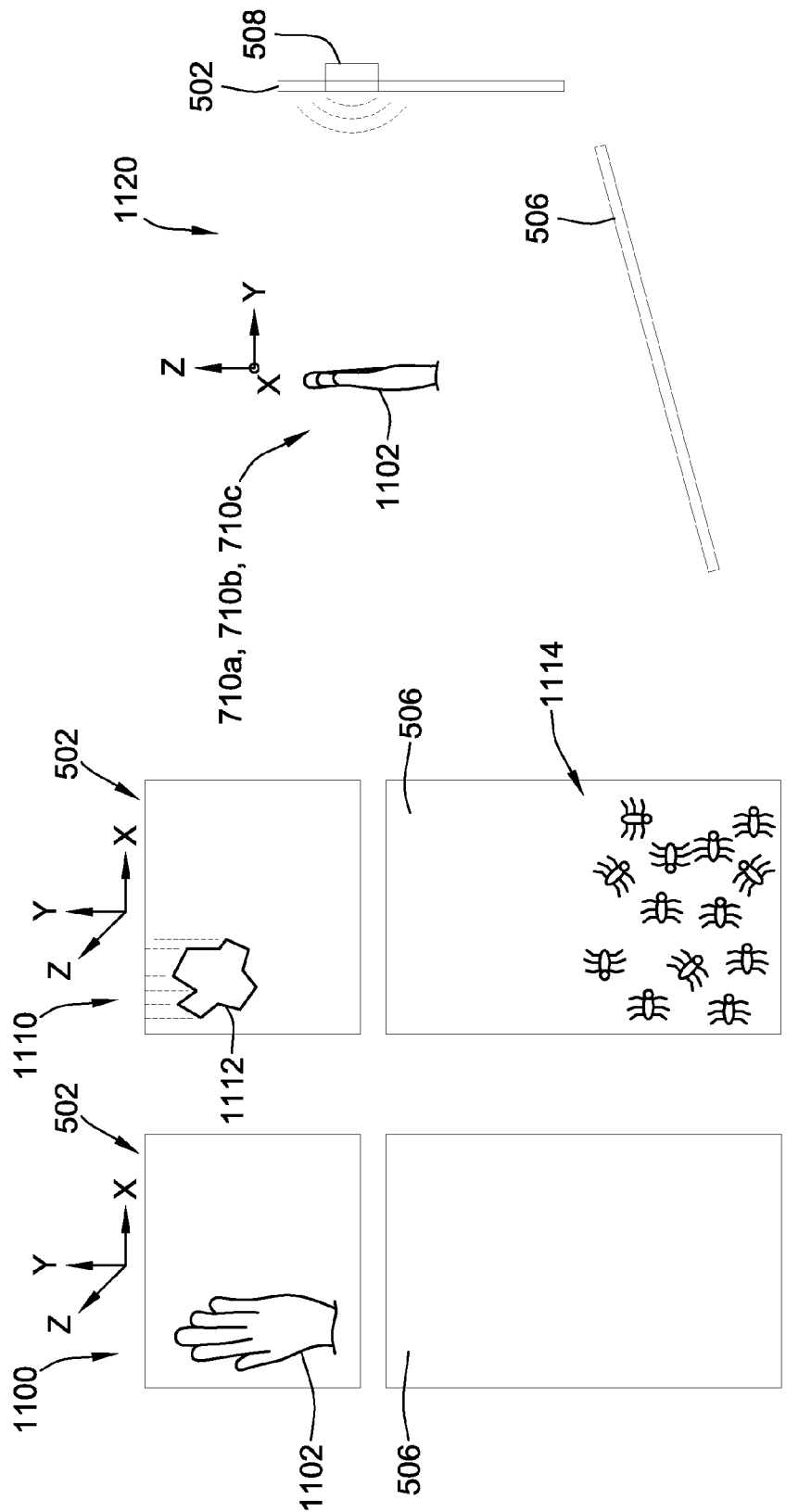

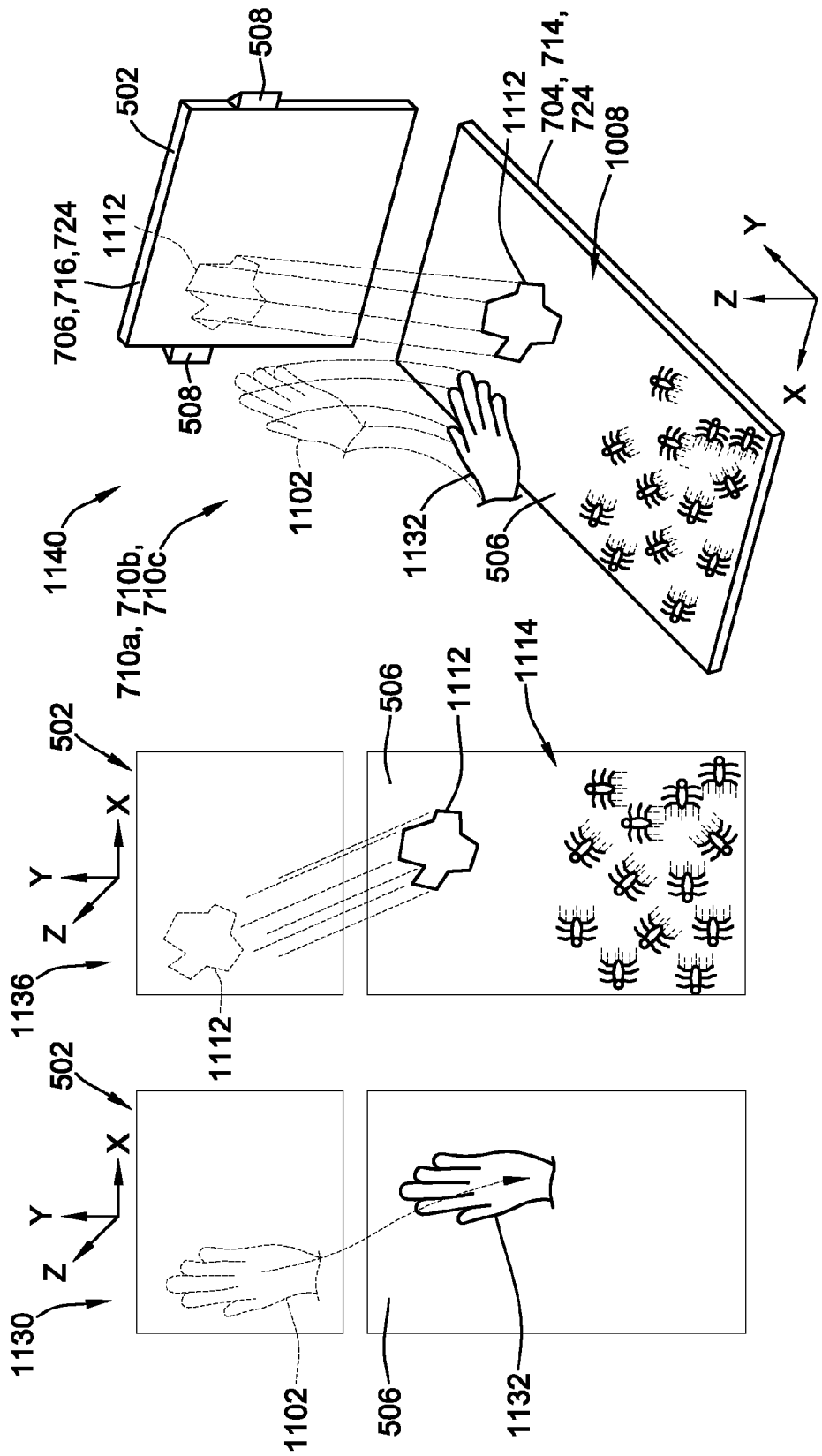

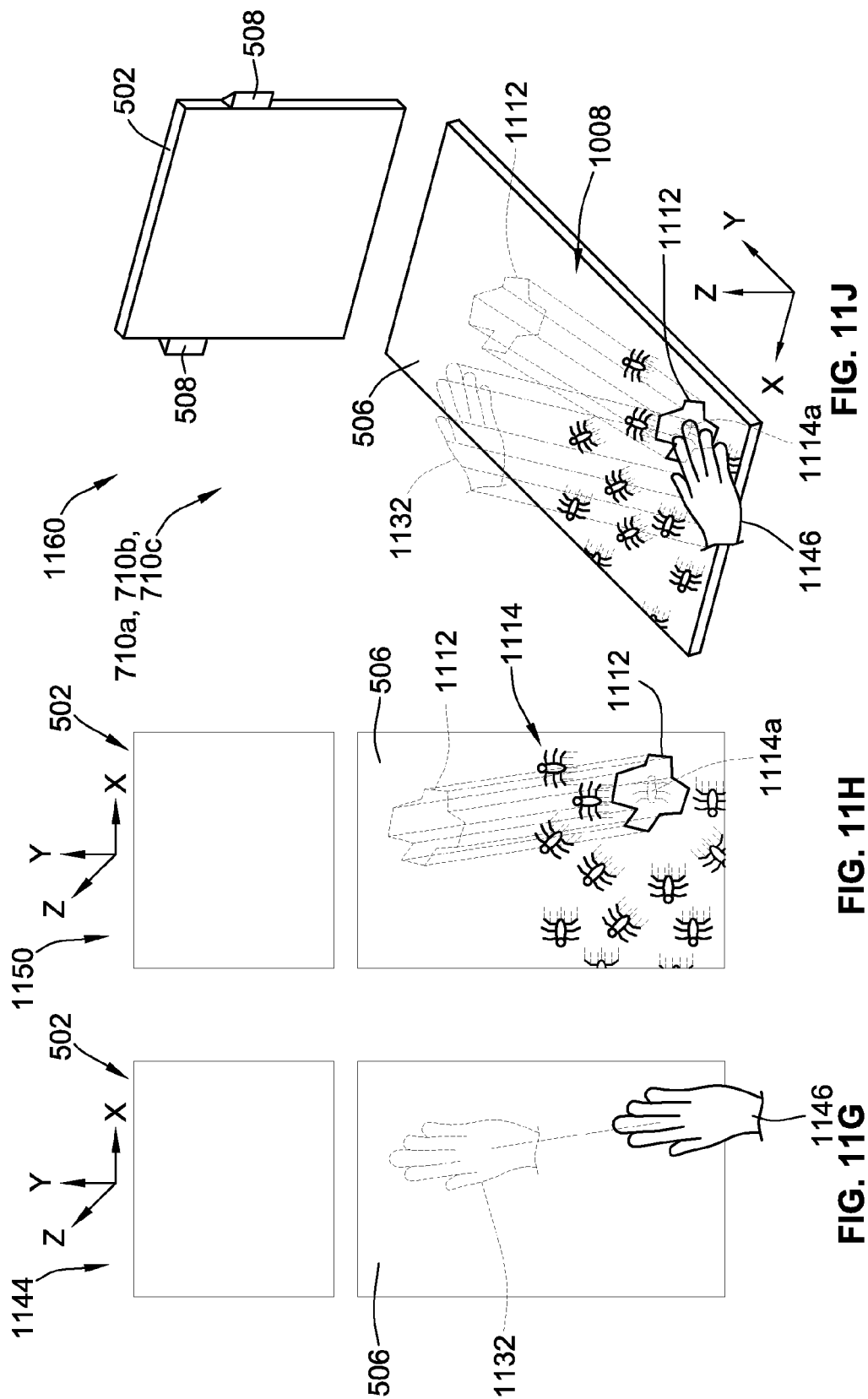

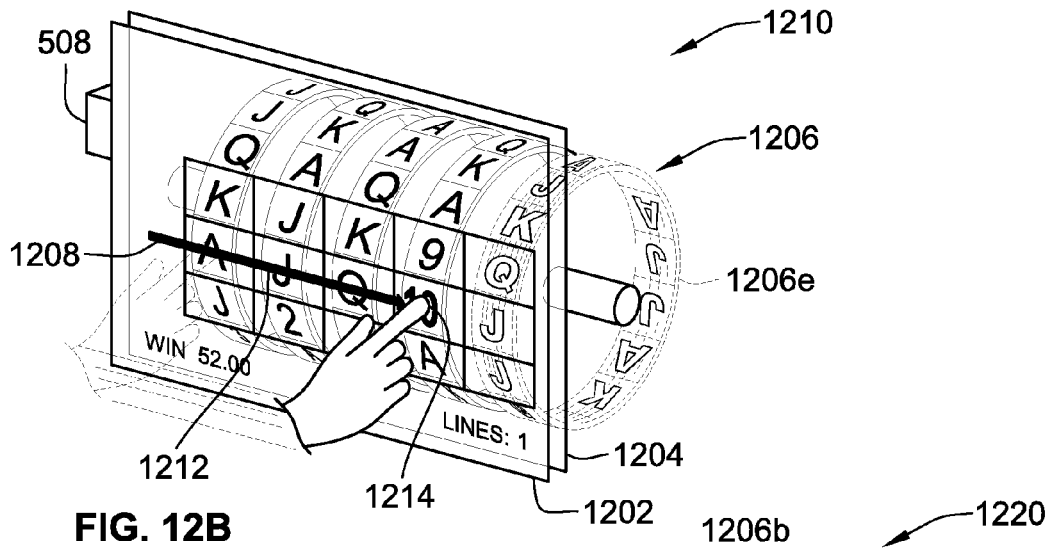
FIG. 12B
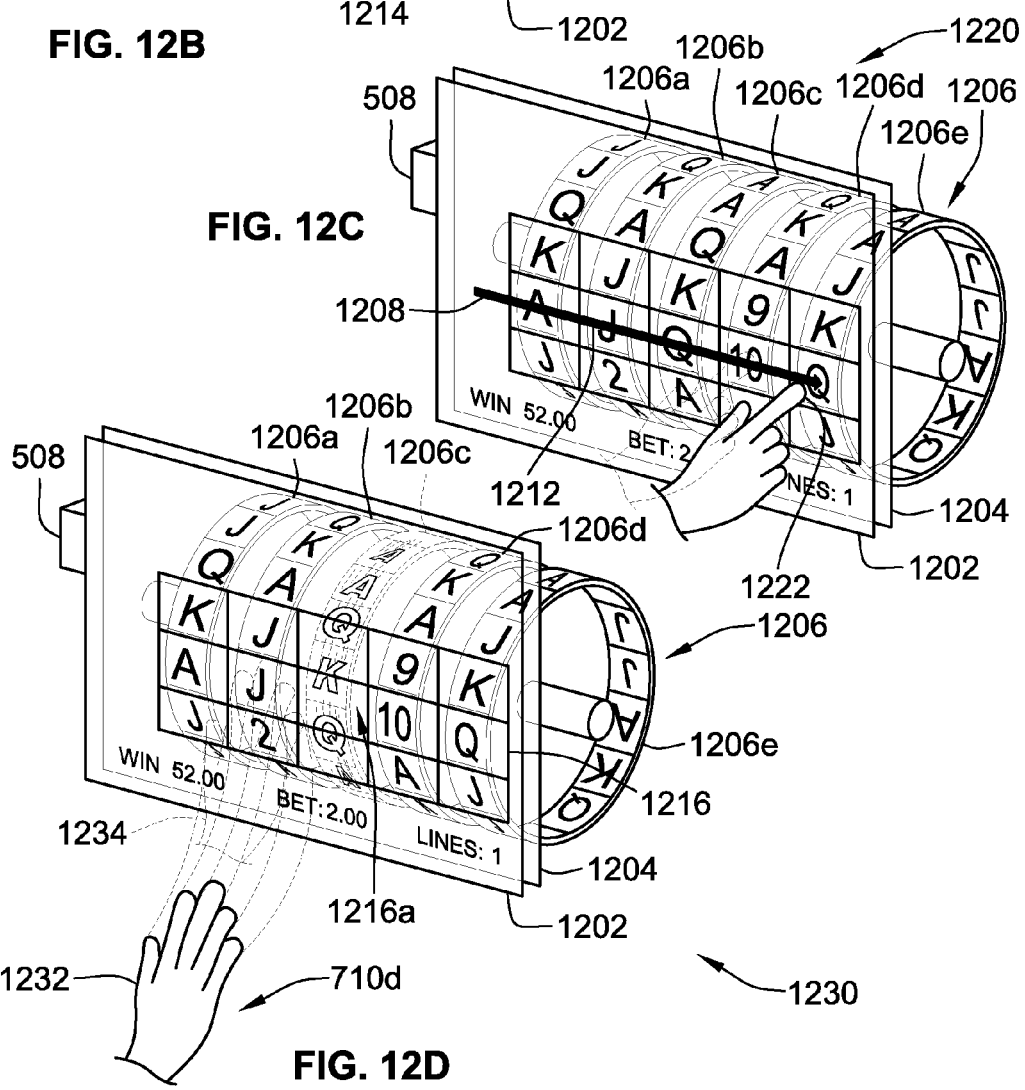
FIG. 12C
FIG. 12D

US 9,086,732 B2

GESTURE FUSION

CROSS-REFERENCE TO RELATED APPLICATION

This application claims the benefit of U.S. Provisional Patent Application No. 61/641,951, filed May 3, 2012, entitled "Gesture Fusion" which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE DISCLOSURE

The present disclosure relates generally to wagering games, and methods for playing wagering games, and more particularly, to gesture sensing systems and methods that sense and process a gesture that transitions between a touch or multi-touch gesture made on a touch surface and a gesture made in a volumetric space.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Existing gesture-sensing systems sense gestures made on a touch surface, such as a touch pad, or gestures made in three-dimensional space. A human who makes a gesture that begins on a touch surface, for example, may feel the desire to continue the interaction with a graphical object displayed on a display by making a gesture with his or her hand or body in free space Likewise, a human who makes a gesture that begins in free space, for example, may wish to continue the interaction with a graphical object on a touch surface, such as a graphical object that appears to be falling or moving toward the human. These and other unfulfilled needs are addressed by the present disclosure.

SUMMARY OF AN ASPECT OF THE DISCLOSURE

A method, non-transitory computer-readable medium, and a system of manipulating an object displayed on a display device assembly using a gesture that transitions between a surface and a volumetric space are disclosed in various aspects. The method includes: first sensing, using a gesture sensing system, a first gesture made relative to one of a surface or a volumetric space adjacent to the surface; responsive to the first sensing, the first gesture influencing a first characteristic of a first object displayed on a display device assembly; second sensing, using the gesture sensing system, a second gesture made relative to the other of the surface or the volumetric space; and responsive to the second sensing, the second gesture influencing the first characteristic or a second characteristic of the first object displayed on the display device assembly or of a second object that is affected by the first characteristic or the second characteristic of the first object.

The first characteristic includes a first movement of the first object, and the second characteristic includes a second movement of the first object that is different from the first movement. The first characteristic includes a velocity of the first object, and the second characteristic includes a direction of the first object. The first gesture is made relative to the surface and the second gesture is made relative to the volumetric space. The first characteristic of the first object corresponds to a movement along a surface along which the first object travels as displayed on the display device assembly. The second characteristic of the first object or the second object corresponds to a movement in space within which the first object or the second object travels as displayed on the display device assembly.

The first gesture transitions directly to the second gesture. The first gesture is made relative to the volumetric space and the second gesture is made relative to the surface. The first characteristic of the first object corresponds to a movement in space within which the first object travels as displayed on the display device assembly. The second characteristic of the first object or the second object corresponds to a movement along a surface along which the first object or the second object travels as displayed on the display device assembly.

The first gesture transitions directly to the second gesture. The first gesture is made by a human hand or a finger and the second gesture is made by a human body part or by a device worn or held by a human. The first gesture maintains contact with the surface as the second gesture is made. The method further includes imparting haptic feedback toward the surface as the second gesture is made.

The first gesture or the second gesture made relative to the surface is a tactile gesture in which a human touches the surface relative to which the first gesture or the second gesture is sensed. The other of the first gesture and the second gesture made relative to the volumetric space is a gesture made in free space.

The gesture sensing system includes a multitouch sensing system for sensing multiple touches simultaneously relative to the surface and at least one imaging device for sensing gestures made relative to the volumetric space. The second object is affected by the first characteristic of the first object in that the first characteristic of the first object causes a corresponding characteristic of the second object to change. The first characteristic includes a direction and a movement. The first gesture launches the first object according to the movement and the direction of the first characteristic. The second gesture steers the first object according to the second characteristic such that the first object moves in the general direction according to the second characteristic.

The display device assembly includes a first display portion that is oriented generally horizontally to provide the surface and a second display portion adjacent the first display portion. The second display portion is oriented generally vertically. The volumetric space includes a space in front of the second display portion.

The display device assembly includes the surface. At least two planes of the volumetric space are bounded by the display device assembly. The first gesture and the second gesture form a continuous gesture. The first gesture and the second gesture are part of a single gesture starting with the first gesture and transitioning directly to the second gesture.

The gesture sensing system includes a gaming terminal configured to conduct a wagering game in response to receiving a wager. The gesture sensing system further includes a portable electronic device having a controller configured to sense gestures in the volumetric space. The method further includes receiving at the electronic gaming terminal from the portable electronic device coordinate information corresponding to coordinates of the gestures made in the volumetric space.

The method further comprising includes the portable electronic device in a docking station on the electronic gaming terminal. The docking station is positioned to orient an imaging device in the portable electronic device toward a player of the electronic gaming terminal to capture the gestures made in the volumetric space and to convert the gestures into corresponding coordinate information.

The portable electronic device has an imaging device. The method further includes: the portable electronic device capturing, using the imaging device, a code displayed by or on the electronic gaming terminal; downloading a three-dimensional (3D) gesture-sensing application to the portable electronic device from a remote server indicated by the code, the remote server being remote from the portable electronic device and hosting the 3D gesture-sensing application; and sensing the gestures in the volumetric space using the downloaded 3D gesture-sensing application. The electronic gaming terminal lacks structure for sensing gestures in the volumetric space.

The method further includes: receiving an indication of a wager to play a wagering game; responsive to receiving the indication of the wager, randomly determining an outcome of the wagering game; and responsive to randomly determining the outcome, displaying an indication of the randomly determined outcome. The first object is associated with the randomly determined outcome of the wagering game. The first gesture and the second gesture have no affect on the outcome that is randomly determined.

The method further includes: displaying on the display device assembly a plurality of elements; moving the first object toward the plurality of elements in accordance with the first gesture and the second gesture; and causing the first object to interact with a first of the elements under the influence of at least the second gesture such that the first element corresponds to the randomly determined outcome.

The first object is a symbol. The method further includes: displaying on the display device assembly an array having a plurality of symbol positions; moving the symbol toward the array in accordance with the first gesture; and moving the symbol within a selected one of the plurality of symbol positions in accordance with the second gesture. The first object or the second object is a selectable element of the wagering game. The selectable element is associated with one of the outcomes of the wagering game or a feature of the wagering game.

The method further includes awarding a number of credits as a function of how the first object interacts with another object displayed on the display device assembly or how the first object interacts with the second object. The method further includes: displaying on the display device assembly an empty or partially empty pick field having a plurality of pick locations to be populated by one or more selectable elements, where the first object corresponds to one of the selectable elements, and where the first movement guides the first object toward the pick field and the second movement populates the first object in a selected one of the pick locations; and displaying the first object at the selected one of the pick locations in the pick field on the display device assembly.

The second object is a physical object. The display device assembly includes a transmissive video display disposed in front of the physical object to portray a video image superimposed upon the physical object. The video image includes the first object. The second gesture influences a movement of the physical object such that the first object as displayed on the display device assembly visually appears to interact with the physical object. The second object is a mechanical reel.

The first object is an avatar that pursues goals of a human that makes the first gesture. The first gesture launches the avatar to pursue a goal on behalf of the human. The second characteristic includes a behavior or action by the avatar in pursuit of the goal, the second gesture being made in the volumetric space and corresponding to the behavior or action.

According to an aspect of the present disclosure, a method of manipulating an object displayed on a display device assembly using a gesture that transitions between a surface and a volumetric space, comprising: first sensing, using a gesture sensing system, a first gesture made relative to one of a surface or a volumetric space adjacent to the surface; responsive to the first sensing, the first gesture influencing a first characteristic of a first object displayed on a display device assembly; second sensing, using the gesture sensing system, a second gesture made relative to the other of the surface or the volumetric space; and responsive to the second sensing, the second gesture influencing the first characteristic or a second characteristic of the first object displayed on the display device assembly or of a second object that is affected by the first characteristic or the second characteristic of the first object.

The first characteristic can include a first movement of the first object, and the second characteristic includes a second movement of the first object that is different from the first movement. The first characteristic can include a velocity of the first object, and the second characteristic can include a direction of the first object.

The first gesture can be made relative to the surface and the second gesture can be made relative to the volumetric space. The first characteristic of the first object can correspond to a movement along a surface along which the first object travels as displayed on the display device assembly. The second characteristic of the first object or the second object can correspond to a movement in space within which the first object or the second object travels as displayed on the display device assembly. The first gesture can transition directly to the second gesture.

The first gesture can be made relative to the volumetric space and the second gesture can be made relative to the surface. The first characteristic of the first object can correspond to a movement in space within which the first object travels as displayed on the display device assembly. The second characteristic of the first object or the second object can correspond to a movement along a surface along which the first object or the second object travels as displayed on the display device assembly. The first gesture can transition directly to the second gesture.

The first gesture can be made by a human hand or a finger and the second gesture is made by a human body part or by a device worn or held by a human. The first gesture can maintain contact with the surface as the second gesture is made. The method can further include imparting haptic feedback toward the surface as the second gesture is made.

The first gesture or the second gesture made relative to the surface can be a tactile gesture in which a human touches the surface relative to which the first gesture or the second gesture is sensed. The other of the first gesture and the second gesture made relative to the volumetric space can be a gesture made in free space.

The gesture sensing system can include a multitouch sensing system for sensing multiple touches simultaneously relative to the surface and at least one imaging device for sensing gestures made relative to the volumetric space.

The second object can be affected by the first characteristic of the first object in that the first characteristic of the first object causes a corresponding characteristic of the second object to change.

The first characteristic can include a direction and a movement. The first gesture can launch the first object according to the movement and the direction of the first characteristic. The second gesture can steer the first object according to the second characteristic such that the first object moves in the general direction according to the second characteristic.

The display device assembly can include a first display portion that is oriented generally horizontally to provide the surface and a second display portion adjacent the first display portion, the second display portion being oriented generally vertically. The volumetric space can include a space in front of the second display portion.

The display device assembly can include the surface. At least two planes of the volumetric space can be bounded by the display device assembly. The first gesture and the second gesture can form a continuous gesture. The first gesture and the second gesture can be part of a single gesture starting with the first gesture and transitioning directly to the second gesture.

The gesture sensing system can include a gaming terminal configured to conduct a wagering game in response to receiving a wager. The gesture sensing system can further include a portable electronic device having a controller configured to sense gestures in the volumetric space. The method can further include receiving at the electronic gaming terminal from the portable electronic device coordinate information corresponding to coordinates of the gestures made in the volumetric space.

The portable electronic device can be received in a docking station on the electronic gaming terminal. The docking station can be positioned to orient an imaging device in the portable electronic device toward a player of the electronic gaming terminal to capture the gestures made in the volumetric space and to convert the gestures into corresponding coordinate information.

The portable electronic device can have an imaging device. The method can further include: the portable electronic device capturing, using the imaging device, a code displayed by or on the electronic gaming terminal, downloading a three-dimensional (3D) gesture-sensing application to the portable electronic device from a remote server indicated by the code, the remote server being remote from the portable electronic device and hosting the 3D gesture-sensing application; and sensing the gestures in the volumetric space using the downloaded 3D gesture-sensing application.

The electronic gaming terminal can lack structure for sensing gestures in the volumetric space. The method can further include: receiving an indication of a wager to play a wagering game; responsive to receiving the indication of the wager, randomly determining an outcome of the wagering game; and responsive to randomly determining the outcome, displaying an indication of the randomly determined outcome.

The first object can be associated with the randomly determined outcome of the wagering game. The first gesture and the second gesture can have no affect on the outcome that is randomly determined.

The method can further include: displaying on the display device assembly a plurality of elements; moving the first object toward the plurality of elements in accordance with the first gesture and the second gesture; and causing the first object to interact with a first of the elements under the influence of at least the second gesture such that the first element corresponds to the randomly determined outcome.

The first object can be a symbol. The method can further include: displaying on the display device assembly an array having a plurality of symbol positions; moving the symbol toward the array in accordance with the first gesture; and moving the symbol within a selected one of the plurality of symbol positions in accordance with the second gesture.

The first object or the second object can be a selectable element of the wagering game. The selectable element can be associated with one of the outcomes of the wagering game or a feature of the wagering game. The method can further include: awarding a number of credits as a function of how the first object interacts with another object displayed on the display device assembly or how the first object interacts with the second object.

The method can further include: displaying on the display device assembly an empty or partially empty pick field having a plurality of pick locations to be populated by one or more selectable elements, wherein the first object corresponds to one of the selectable elements, and wherein the first movement guides the first object toward the pick field and the second movement populates the first object in a selected one of the pick locations; and displaying the first object at the selected one of the pick locations in the pick field on the display device assembly.

The method of the second object can be a physical object. The display device assembly can include a transmissive video display disposed in front of the physical object to portray a video image superimposed upon the physical object. The video image can include the first object. The second gesture can influence a movement of the physical object such that the first object as displayed on the display device assembly visually appears to interact with the physical object. The second object can be a mechanical reel.

The first object can be an avatar that pursues goals of a human that makes the first gesture. The first gesture can launch the avatar to pursue a goal on behalf of the human. The second characteristic can include a behavior or action by the avatar in pursuit of the goal. The second gesture can be made in the volumetric space and corresponding to the behavior or action.

According to another aspect of the present disclosure, a non-transitory computer-readable medium stores instructions that, when executed by one or more processors, implement a method of manipulating an object displayed on a display device assembly using a gesture that transitions between a surface and a volumetric space, the method comprising: first sensing, using a gesture sensing system, a first gesture made relative to one of a surface or a volumetric space adjacent to the surface; responsive to the first sensing, the first gesture influencing a first characteristic of a first object displayed on a display device assembly; second sensing, using the gesture sensing system, a second gesture made relative to the other of the surface or the volumetric space; and responsive to the second sensing, the second gesture influencing the first characteristic or a second characteristic of the first object displayed on the display device assembly or of a second object that is affected by the first characteristic or the second characteristic of the first object.

The first characteristic can include a first movement of the first object. The second characteristic can include a second movement of the first object that is different from the first movement. The first characteristic can include a velocity of the first object. The second characteristic can include a direction of the first object.

The first gesture can be made relative to the surface and the second gesture can be made relative to the volumetric space. The first characteristic of the first object can correspond to a movement along a surface along which the first object travels as displayed on the display device assembly. The second characteristic of the first object or the second object can correspond to a movement in space within which the first object or the second object travels as displayed on the display device assembly. The first gesture can transition directly to the second gesture.

The first gesture can be made relative to the volumetric space and the second gesture can be made relative to the surface. The first characteristic of the first object can correspond to a movement in space within which the first object travels as displayed on the display device assembly. The second characteristic of the first object or the second object can correspond to a movement along a surface along which the first object or the second object travels as displayed on the display device assembly.

The first gesture can transition directly to the second gesture. The first gesture can be made by a human hand or a finger and the second gesture can be made by a human body part or by a device worn or held by a human. The first gesture can maintain contact with the surface as the second gesture is made. The method can further include imparting haptic feedback toward the surface as the second gesture is made.

The first gesture or the second gesture made relative to the surface can be a tactile gesture in which a human touches the surface relative to which the first gesture or the second gesture is sensed. The other of the first gesture and the second gesture made relative to the volumetric space can be a gesture made in free space.

The gesture sensing system can include a multitouch sensing system for sensing multiple touches simultaneously relative to the surface and at least one imaging device for sensing gestures made relative to the volumetric space. The second object can be affected by the first characteristic of the first object in that the first characteristic of the first object causes a corresponding characteristic of the second object to change.

The first characteristic can include a direction and a movement. The first gesture can launch the first object according to the movement and the direction of the first characteristic. The second gesture can steer the first object according to the second characteristic such that the first object moves in the general direction according to the second characteristic.

The display device assembly can include a first display portion that is oriented generally horizontally to provide the surface and a second display portion adjacent the first display portion. The second display portion can be oriented generally vertically. The volumetric space can include a space in front of the second display portion.

The display device assembly can include the surface. At least two planes of the volumetric space can be bounded by the display device assembly. The first gesture and the second gesture can form a continuous gesture. The first gesture and the second gesture can be part of a single gesture starting with the first gesture and transitioning directly to the second gesture.

The gesture sensing system can include a gaming terminal configured to conduct a wagering game in response to receiving a wager. The gesture sensing system can further include a portable electronic device having a controller configured to sense gestures in the volumetric space. The method can further comprise receiving at the electronic gaming terminal from the portable electronic device coordinate information corresponding to coordinates of the gestures made in the volumetric space.

The method can further include receiving the portable electronic device in a docking station on the electronic gaming terminal. The docking station can be positioned to orient an imaging device in the portable electronic device toward a player of the electronic gaming terminal to capture the gestures made in the volumetric space and to convert the gestures into corresponding coordinate information.

The portable electronic device can have an imaging device. The method can further comprise: the portable electronic device capturing, using the imaging device, a code displayed by or on the electronic gaming terminal; downloading a three-dimensional (3D) gesture-sensing application to the portable electronic device from a remote server indicated by the code, the remote server being remote from the portable electronic device and hosting the 3D gesture-sensing application; and sensing the gestures in the volumetric space using the downloaded 3D gesture-sensing application. The electronic gaming terminal can lack structure for sensing gestures in the volumetric space.

The method can further comprise: receiving an indication of a wager to play a wagering game; responsive to receiving the indication of the wager, randomly determining an outcome of the wagering game; and responsive to randomly determining the outcome, displaying an indication of the randomly determined outcome.

The first object can be associated with the randomly determined outcome of the wagering game. The first gesture and the second gesture can have no affect on the outcome that is randomly determined. The method can further comprise: displaying on the display device assembly a plurality of elements; moving the first object toward the plurality of elements in accordance with the first gesture and the second gesture; and causing the first object to interact with a first of the elements under the influence of at least the second gesture such that the first element corresponds to the randomly determined outcome.

The first object can be a symbol. The method can further comprise: displaying on the display device assembly an array having a plurality of symbol positions; moving the symbol toward the array in accordance with the first gesture; and moving the symbol within a selected one of the plurality of symbol positions in accordance with the second gesture. The first object or the second object can be a selectable element of the wagering game. The selectable element can be associated with one of the outcomes of the wagering game or a feature of the wagering game.

The method can further comprise: awarding a number of credits as a function of how the first object interacts with another object displayed on the display device assembly or how the first object interacts with the second object.

The method can further comprise: displaying on the display device assembly an empty or partially empty pick field having a plurality of pick locations to be populated by one or more selectable elements, wherein the first object corresponds to one of the selectable elements, and wherein the first movement guides the first object toward the pick field and the second movement populates the first object in a selected one of the pick locations; and displaying the first object at the selected one of the pick locations in the pick field on the display device assembly.

The second object can be a physical object. The display device assembly can include a transmissive video display disposed in front of the physical object to portray a video image superimposed upon the physical object. The video image can include the first object. The second gesture can influence a movement of the physical object such that the first object as displayed on the display device assembly visually appears to interact with the physical object. The second object can be a mechanical reel.

The first object can be an avatar that pursues goals of a human that makes the first gesture. The first gesture can launch the avatar to pursue a goal on behalf of the human. The second characteristic can include a behavior or action by the avatar in pursuit of the goal. The second gesture can be made in the volumetric space and corresponding to the behavior or action.

According to yet a further aspect of this disclosure, a system for manipulating an object displayed on a display device assembly using a gesture that transitions between a surface and a volumetric space, comprises: a display device assembly including a surface; a gesture sensing system that senses a first gesture made relative to one of the surface or a volumetric space adjacent to the surface, the first gesture influencing a first characteristic of a first object displayed on the display device assembly, the gesture sensing system sensing a second gesture made relative to the other of the surface or the volumetric space; and one or more controllers configured to cause the second gesture to influence the first characteristic or a second characteristic of the first object displayed on the display device assembly or of a second object that is affected by the first characteristic or the second characteristic of the first object.

The first characteristic can include a first movement of the first object. The second characteristic can include a second movement of the first object that is different from the first movement. The first characteristic can include a velocity of the first object. The second characteristic can include a direction of the first object.

The first gesture can be made relative to the surface and the second gesture can be made relative to the volumetric space. The first characteristic of the first object can correspond to a movement along a surface along which the first object travels as displayed on the display device assembly. The second characteristic of the first object or the second object can correspond to a movement in space within which the first object or the second object travels as displayed on the display device assembly. The first gesture can transition directly to the second gesture.

The first gesture can be made relative to the volumetric space and the second gesture can be made relative to the surface. The first characteristic of the first object can correspond to a movement in space within which the first object travels as displayed on the display device assembly. The second characteristic of the first object or the second object can correspond to a movement along a surface along which the first object or the second object travels as displayed on the display device assembly. The first gesture can transition directly to the second gesture.

The first gesture can be made by a human hand or a finger and the second gesture can be made by a human body part or by a device worn or held by a human.

The first gesture can maintain contact with the surface as the second gesture is made. The system can further include a haptic feedback device that imparts haptic feedback toward the surface as the second gesture is made.

The first gesture or the second gesture made relative to the surface can be a tactile gesture in which a human touches the surface relative to which the first gesture or the second gesture is sensed. The other of the first gesture and the second gesture made relative to the volumetric space can be a gesture made in free space.

The gesture sensing system can include a multitouch sensing system for sensing multiple touches simultaneously relative to the surface and at least one imaging device for sensing gestures made relative to the volumetric space. The second object can be affected by the first characteristic of the first object in that the first characteristic of the first object causes a corresponding characteristic of the second object to change. The first characteristic can include a direction and a movement. The first gesture can launch the first object according to the movement and the direction of the first characteristic. The second gesture can steer the first object according to the second characteristic such that the first object moves in the general direction according to the second characteristic.

The display device assembly can include a first display portion that is oriented generally horizontally to provide the surface and a second display portion adjacent the first display portion. The second display portion can be oriented generally vertically. The volumetric space can include a space in front of the second display portion.

The display device assembly can include the surface. At least two planes of the volumetric space can be bounded by the display device assembly. The first gesture and the second gesture can form a continuous gesture. The first gesture and the second gesture can be part of a single gesture starting with the first gesture and transitioning directly to the second gesture.

The gesture sensing system can include a gaming terminal configured to conduct a wagering game in response to receiving a wager. The gesture sensing system can further include a portable electronic device having a controller configured to sense gestures in the volumetric space. The gaming terminal can be configured to receive from the portable electronic device coordinate information corresponding to coordinates of the gestures made in the volumetric space.

The electronic gaming terminal can include a docking station for receiving the portable electronic device. The docking station can be positioned to orient an imaging device in the portable electronic device toward a player of the electronic gaming terminal to capture the gestures made in the volumetric space and to convert the gestures into corresponding coordinate information.

The portable electronic device can have an imaging device, which can capture a code displayed by or on the electronic gaming terminal. The portable electronic device can be configured to download a three-dimensional (3D) gesture-sensing application from a remote server indicated by the code. The remote server can be remote from the portable electronic device and can host the 3D gesture-sensing application. The downloaded 3D gesture-sensing application can sense the gestures in the volumetric space. The electronic gaming terminal can lack structure for sensing gestures in the volumetric space.

The one or more controllers can be further configured to: receive an indication of a wager to play a wagering game; responsive to receiving the indication of the wager, randomly determine an outcome of the wagering game; and responsive to randomly determining the outcome, display an indication of the randomly determined outcome.

The first object can be associated with the randomly determined outcome of the wagering game. The first gesture and the second gesture can have no affect on the outcome that is randomly determined.

The system can further comprise: displaying on the display device assembly a plurality of elements; moving the first object toward the plurality of elements in accordance with the first gesture and the second gesture; and causing the first object to interact with a first of the elements under the influence of at least the second gesture such that the first element corresponds to the randomly determined outcome.

The first object can be a symbol. The one or more controllers can be configured to: display on the display device assembly an array having a plurality of symbol positions; move the symbol toward the array in accordance with the first gesture; and move the symbol within a selected one of the plurality of symbol positions in accordance with the second gesture.

The first object or the second object can be a selectable element of the wagering game. The selectable element can be associated with one of the outcomes of the wagering game or a feature of the wagering game.

The one or more controllers can be configured to award a number of credits as a function of how the first object interacts with another object displayed on the display device assembly or how the first object interacts with the second object.

The one or more controllers can be configured to: display on the display device assembly an empty or partially empty pick field having a plurality of pick locations to be populated by one or more selectable elements. The first object can correspond to one of the selectable elements. The first movement can guide the first object toward the pick field, and the second movement can populate the first object in a selected one of the pick locations. The one or more controllers can be further configured to display the first object at the selected one of the pick locations in the pick field on the display device assembly.

The second object can be a physical object. The display device assembly can include a transmissive video display disposed in front of the physical object to portray a video image superimposed upon the physical object. The video image can include the first object. The second gesture can influence a movement of the physical object such that the first object as displayed on the display device assembly visually appears to interact with the physical object. The second object can be a mechanical reel.

The first object can be an avatar that pursues goals of a human that makes the first gesture. The first gesture can launch the avatar to pursue a goal on behalf of the human. The second characteristic can include a behavior or action by the avatar in pursuit of the goal. The second gesture can be made in the volumetric space and corresponding to the behavior or action.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 6 is a flow chart diagram of optional further methods for manipulating the object or other objects.

FIGS. 8A-8H and 8J-8M illustrates sequences of a gesture that starts on a surface and transitions to a volumetric space and the corresponding manipulation of an object by the gesture as displayed on one or more displays.

FIGS. 9A-9H and 9J-9M illustrate sequences of a gesture that starts on a surface and transitions to a volumetric space and the corresponding manipulation of a wagering-game symbol to populate an array of symbols as displayed on one or more displays.

FIGS. 10A-10H and 10J illustrate sequences of a gesture that starts in a volumetric space and transitions to a surface and the corresponding manipulation of an object onto a pick field to populate the pick field as displayed on one or more displays.

FIGS. 11A-11H and 11J illustrate sequences of a gesture that starts in a volumetric space and transitions to a surface and the corresponding manipulation of objects displayed relative to the body part making the gesture as displayed on one or more displays.

FIGS. 12A-12D illustrate sequences of a gesture that starts on a touch-sensitive substrate that overlays a transmissive display through which physical mechanical reels are show and the corresponding apparent manipulation of the mechanical reels using the surface and a following air gesture.

DETAILED DESCRIPTION

Figure 1:
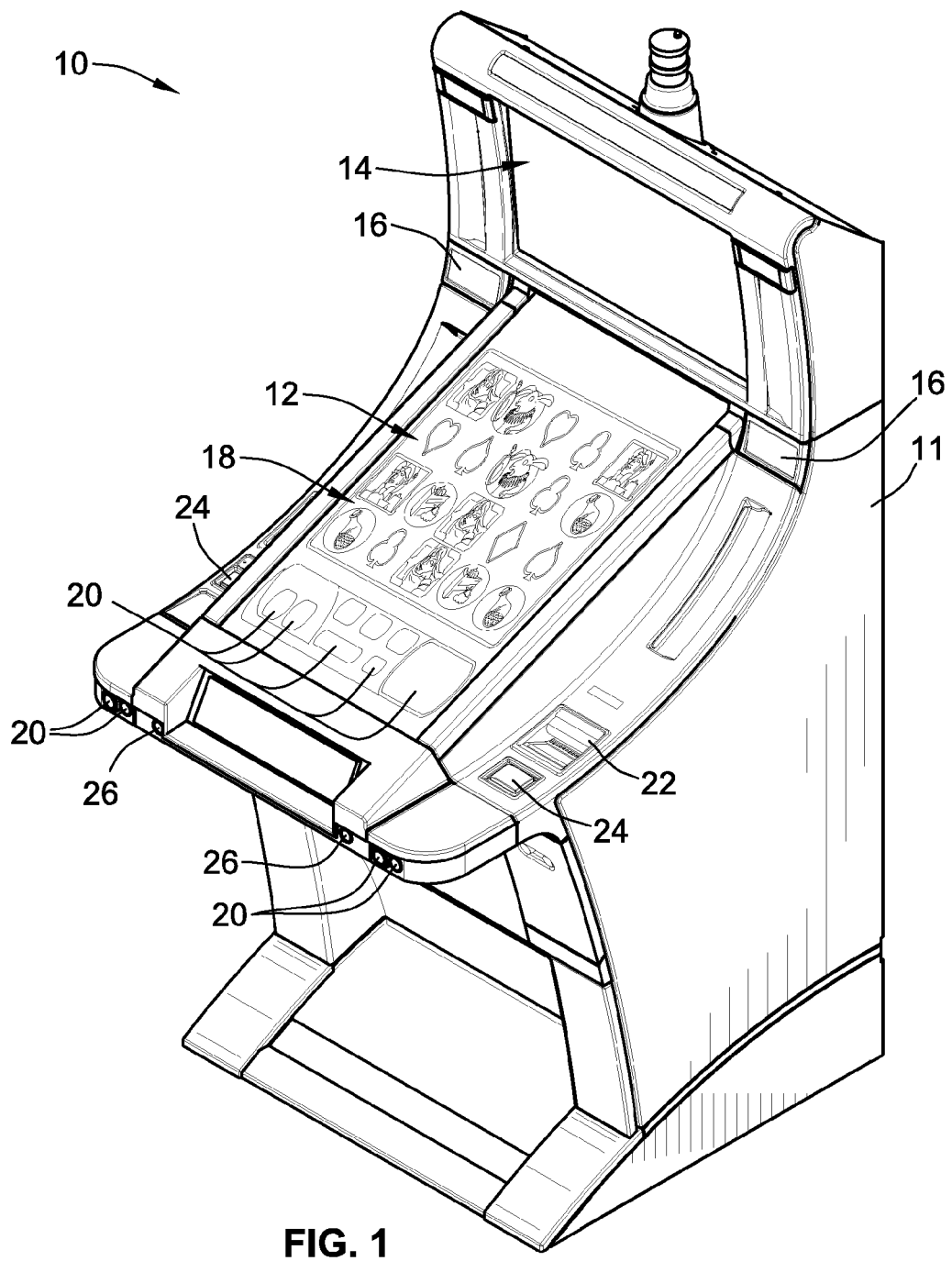
FIG. 1 is a perspective view of a free-standing gaming terminal according to an aspect of the present disclosure.

While the present disclosure is susceptible of aspects in many different forms, there is shown in the drawings and will herein be described in detail preferred embodiments of the disclosure with the understanding that the present disclosure is to be considered as an exemplification of the principles of the inventions and is not intended to limit the broad aspect of the inventions to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, there is shown a gaming terminal 10 similar to those used in gaming establishments, such as casinos. With regard to the present disclosure, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or a controller for processing. The electronic data signals are selected from a group consisting essentially of an electrical current, an electrical voltage, an electrical charge, an optical signal, an optical element, a magnetic signal, and a magnetic element.

Figure 2:
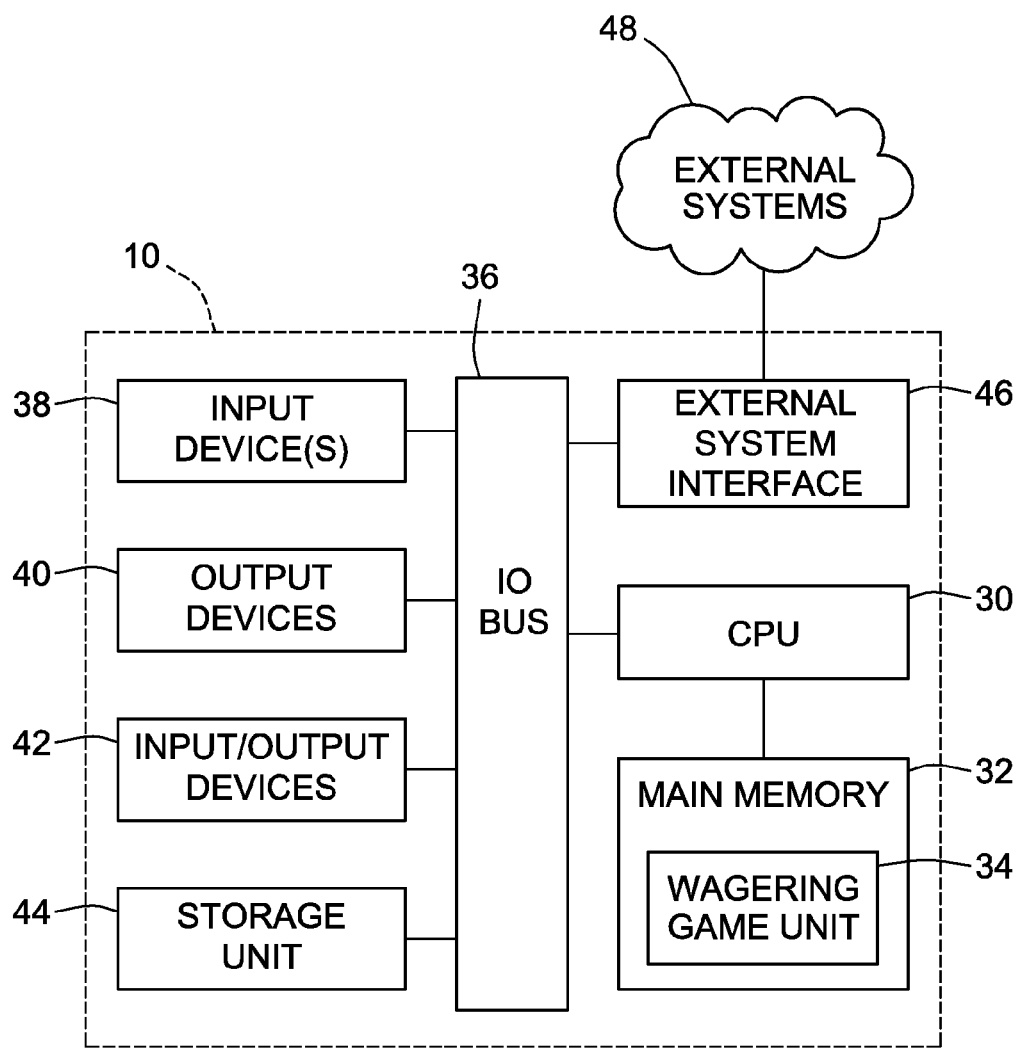
FIG. 2 is a schematic view of a gaming system according to an aspect of the present disclosure.

Turning now to FIG. 2, there is shown a block diagram of the gaming-terminal architecture. The gaming terminal 10 includes a central processing unit (CPU) or a controller 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
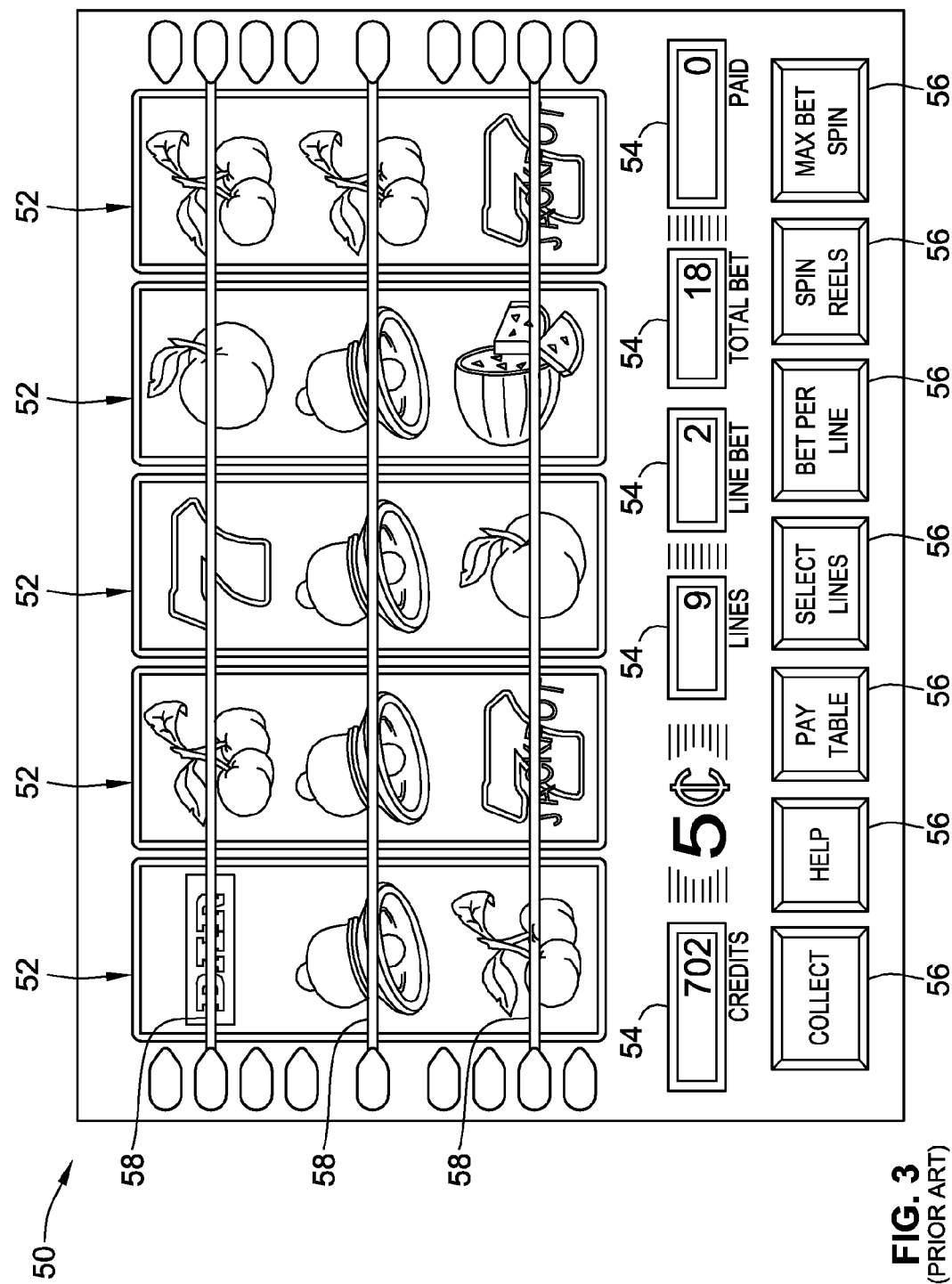
FIG. 3 is an image of an exemplary basic-game screen of a wagering game displayed on a gaming terminal, according to an aspect of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Aspects of the present disclosure describe systems and methods of manipulating an object displayed on a display device assembly using a gesture that transitions between a surface and a volumetric space. This gesture can be referred to herein for ease of discussion as a "fusion" type of gesture because it starts on a surface and then transitions into a volumetric space or vice versa. The surface resides on a two dimensional (2D) surface or a physical surface whereas the volumetric space occupies a three-dimensional (3D) space. Thus, the gesture transitions between a physical surface and a 3D space, and in that sense switches between two different sets of dimensions. The term manipulating includes causing a characteristic of the object to change, such as the size, shape, or color, for example, or the velocity, movement, direction, spin, rotation, or acceleration of the object, or pressure applied to the object, under the control of the gesture, which can be made by a hand, finger, or body part (such as the upper torso or head) of a human, for example, or by a wand or other structure held or worn by the human. In implementations in which the first object is an avatar controlled or directed by a human player, the characteristic can include a behavior or action by the avatar in pursuit of a goal on the human player's behalf, where such behavior or action can include seek, chase, hide, or return. The surface can be flat, curved, or non-flat, and can include a smooth opaque or transparent or semi-transparent substrate relative to which one or more touches by one or more fingers or other body part or a pen or a stylus or the like can be sensed simultaneously and converted into a corresponding gesture as data comprising gesture coordinate information and/or gesture information relating to any combination of the direction, length, speed (velocity), acceleration, or pressure.

A volumetric space differs from a surface in that a volumetric space occupies a three-dimensional volume of space, which can be physically bounded along one or more planes by one or more structures, such as a cabinet or housing 12 of a gaming terminal, such as the gaming terminal 10 or any of the gaming terminals 700a, 700b, 700c shown in FIGS. 7A-7C and described in more detail below. For convenience, a gesture made in a volumetric space can also be referred to herein as an "air" gesture as opposed to a surface gesture, which is made relative to a two-dimensional surface, such as a flat or curved surface. A gesture that starts in the air and transitions to a surface can be referred to as an "air-to-surface" gesture, and a gesture that starts on a surface and transitions to the air can be referred to as a "surface-to-air" gesture. The use of the term "air" is for convenience only and is not intended to limit the volumetric space to any particular medium, such as air or other gas. In some aspects, the gesture transitions from one medium (surface or air) to the other (air or surface) in one seamless motion or movement without interruption. Note that as the gesture is made, part of the movement or motion can be ignored, for example, if a human is making a surface gesture, the air gesture can be picked up after the human's arm or hand has exceeded a predetermined distance above the surface relative to which the surface gesture was made. The term "relative to" in the context of a surface means that a part of the human, such as a finger or hand, can directly make tactile contact or touch a substrate forming the surface or can come in near-contact with the substrate without actually physically touching or contacting it. Some substrates, such as those that are part of a touch-sensitive device such as a touchscreen 38, need to be touched by one or more body parts to complete a circuit that senses the touched location(s). Other substrates, such as capacitive touch-sensitive devices or camera-based gesture sensing systems, can sense a gesture when one or more body parts are brought in close proximity, but do not actually touch or make contact with, the surface.

Figure 4:
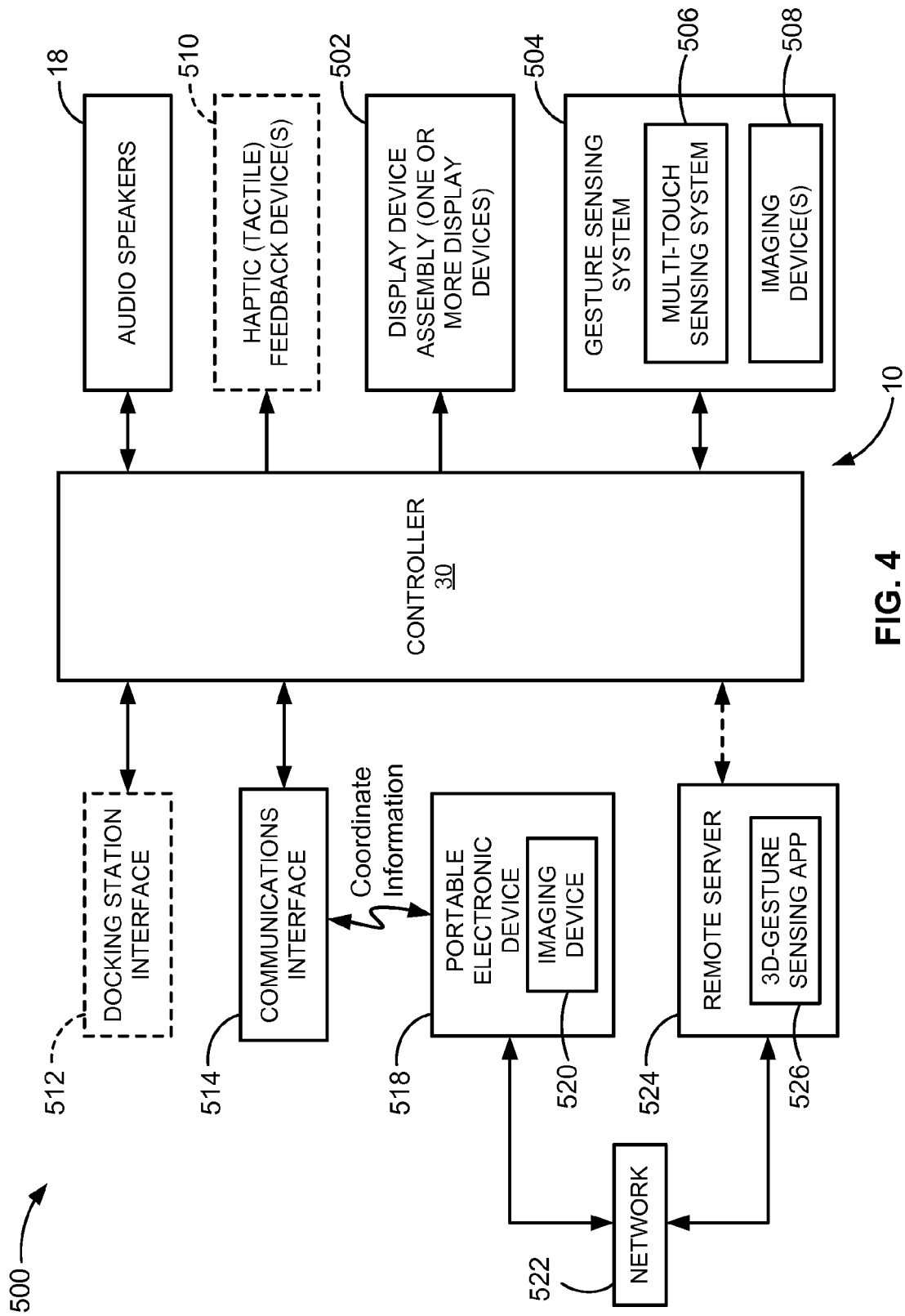
FIG. 4 is a functional block diagram of a system configured to sense gestures that transition between a surface and a volumetric space according to aspects of the present disclosure.

FIG. 4 illustrates a functional block diagram of an exemplary implementation of a system 500 that can sense and process a gesture that transitions between a surface and a volumetric space. The system 500 includes a controller, such as the CPU 30, but it should be understood that the present disclosure is not limited to gaming terminals on which wagering games can be conducted. Rather, the present disclosure can be used with any controller in any electronic device. Some aspects use the CPU 30 discussed herein, and for ease of discussion, the examples described herein will refer to the CPU 30. The CPU 30 can include one or more controllers, some of which can be distributed over a network, such as in a client-server architecture where the client and the server each has a controller. Different controllers can be responsible for handling different functions according to the aspects described herein. In some aspects, the system 500 includes a gaming terminal, such as the gaming terminal 10 or a gaming terminal based on the gaming terminal 10, meaning that the gaming terminal of the system 500 shares some or all of the components and functionality of the gaming terminal 10 or any other gaming terminal disclosed herein.

The system 500 includes a display device assembly 502, which can include one or more display devices. Examples of display devices are shown and described in more detail in connection with FIGS. 7A to 7C below. The display device assembly 502 can be considered to be a multi-faceted display comprising multiple viewable display surfaces or can form a single, continuous substrate relative to which graphical images are displayed. The one or more display devices can be part of the gaming terminal, such as the gaming terminal 10, or one or more of the display devices can be physically separate but electronically coupled to the gaming terminal, such as a community display configured to display a community wagering game, or a display device of a portable electronic device as described in more detail below. When a portable electronic device or another electronic device is involved in detecting part or all of a gesture, the display device assembly 502 includes the display device of the electronic device. The surface, as used herein, can be part of the one or more display devices. For example, the surface can be in an overlapping relationship with one of the display devices of the display device assembly 502. For example, the surface can be a transparent touch screen 38 that overlays a video display.

The system 500 includes a gesture sensing system 504, which senses or detects a gesture that transitions between a surface and a volumetric space. Sensing or detecting a gesture includes converting or transforming a physical gesture such as made by a human on a surface or in a volumetric space into computer-readable data indicative of characteristics of the physical gesture, such as its coordinates on a physical surface or in 3D volumetric space, direction, speed or velocity, acceleration, pressure, distance, and the like. In this example, the gesture sensing system 504 includes a multi-touch sensing system 506, which senses multiple touches simultaneously relative to the surface. The gesture sensing system 504 can include, alternately or additionally with the multi-touch sensing system 506, one or more imaging devices 508 for sensing gestures made relative to the volumetric space. The imaging device 508 can include a digital video camera, for example. The gesture sensing system 504 can include sensing technology such as a SOFTKINETIC system having a DEPTH-SENSE camera available from Softkinetic International SA/NV, PRIMESENSE natural interaction 3D machine-vision system available from PrimeSense, Ltd., or KINECT motion-sensing input device available from Microsoft Corporation. The components and functionality of these conventional systems are incorporated herein by reference in their entirety. The particular details of the structures involved in sensing gestures in a volumetric space and converting those sensed gestures to corresponding computer-readable data are not salient features of the present disclosure. Instead of a multi-touch sensing system 506, the gesture sensing system 504 can include a single-touch touch screen 38 capable of sensing one touch or gesture at a time made relative to a touch-sensitive surface of the touch sensing system 38. In its most basic form, the multi-touch sensing system 506 can include a button or a trackball. Any suitable device configured to sense or detect a tactile-based gesture can be used to sense or detect a gesture made relative to the surface. In short, in these examples, the gesture sensing system 504 includes a sensing system, such as the multi-touch sensing system 506, for sensing tactile gestures made on the surface and an imaging system, such as the imaging device(s) 508, for sensing air gestures made in the volumetric space. Alternately, a camera-based imaging system without a tactile sensor can be used to sense gestures made on or hovering near a surface as well as gestures made in a volumetric space. The term "multi-touch sensing system" as used herein includes all of the examples described above.

The system 500 can optionally include one or more haptic feedback devices 510 configured to impart haptic feedback toward the surface as a surface or air gesture is made. As detailed below, for example, one hand of a human can be used to make a surface gesture and can remain on the surface while another hand is used to make an air gesture. As the air gesture is made and while the hand of the human remains on the surface, the haptic feedback device 510 can impart haptic feedback toward the surface to provide tactile feedback to the hand. Haptic examples are described in more detail below. Any conventional haptic feedback device can be used in these examples, and can be disposed adjacent the one or more displays of the display device assembly 502 for imparting haptic feedback relative to a surface of the one or more displays.

The system 500 can include audio speakers 16, for outputting sound that can be coordinated or synchronized with the gesture to provide audible cues or feedback as the gesture is made relative to the surface and/or in the volumetric space. These audible cues or feedback can be further coordinated or synchronized with the haptic feedback device(s) 510.

In some, but not all, aspects, the system 500 can include a docking station interface 512 that interfaces, either by an electro-mechanical connector or wirelessly, a portable electronic device 518 with the gaming terminal 10. When the docking station interface 512 includes a connector, the gaming terminal 10 is configured to hold the portable electronic device 518 relative to the cabinet 12, such as shown and described in more detail in connection with FIGS. 7A-7B below.

The portable electronic device 518 can be used to capture, sense, or detect the gesture made relative to the surface or in volumetric space using the device's conventional touch-screen or multi-touch sensing device (not shown) or an imaging device 520, such as a digital camera. The portable electronic device 518 can communicate coordinate information corresponding to the gesture to a communications interface 514 of the gaming terminal 10 or through the connector of the docking station interface 512. A remote server 524, which is remote from at least the portable electronic device 518 and optionally also the gaming terminal 10, stores a three-dimensional (3D)-gesture sensing software application 526 that is configured to sense or detect a gesture made in volumetric space. When requested from the portable electronic device 518, the 3D-gesture sensing software application 526 is downloaded via a network 522, such as a data cellular network, from the remote server 524 to the portable electronic device 518. The user of the portable electronic device 518 can be prompted to download the 3D-gesture sensing software application 526 by the gaming terminal 10 displaying an indicium, such as a QR barcode 708 shown in FIG. 7A, for example, that the imaging device 520 captures and a controller of the portable electronic device 518 converts into a corresponding host address associated with the remote server 524 for downloading the application 526. An example of a 3D-gesture sensing application 526 is available from or can be based on a technology referred to as XTR3D by Extreme Reality, Ltd. based in Herzlia Pituah, Israel. These aspects are discussed in more detail below in connection with FIGS. 7A and 7B. The coordinate information communicated by the portable electronic device 518 is indicative of coordinates of the gestures made in the volumetric space. The coordinate information can be communicated in real time as the player is forming the gesture in the volumetric space, or the coordinate information can be communicated as a moving three-dimensional model of the gesture. This configuration allows the gaming terminal 10 to leverage the processing horsepower of the portable electronic device 512 to take on the burden of sensing the processing intensive operations needed to sense a gesture made in volumetric space, freeing the CPU 30 of the gaming terminal 10 to focus on other functions, such as wagering game functions. Note that the display device assembly 502 can include a conventional display device (such as an LCD screen) of the portable electronic device 518, such that the object being manipulated by the gesture can be displayed, for at least part of the gesture, on the display device of the portable electronic device 518.

Figure 5:
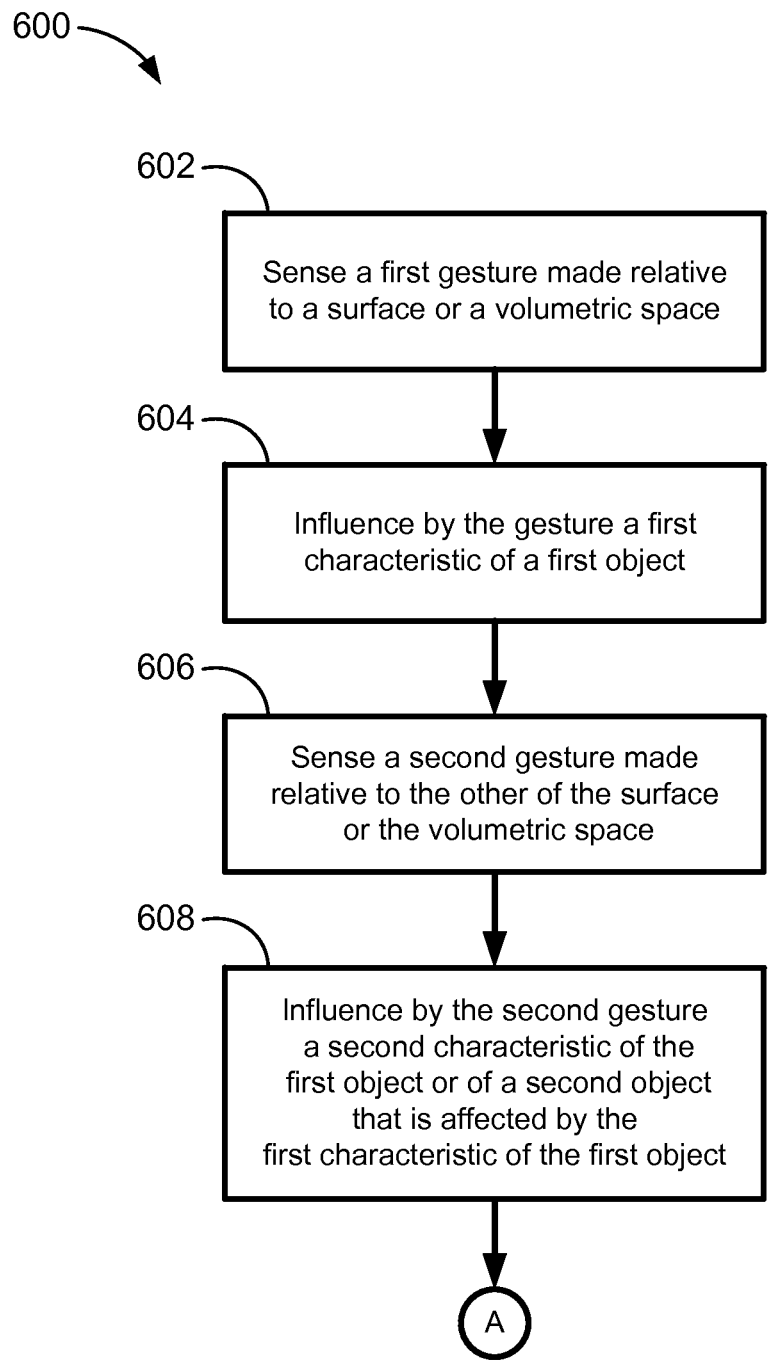
FIG. 5 is a flow chart diagram of a method of manipulating an object using a first gesture made relative to a surface or a volumetric space and a second gesture made relative to the other of a surface and a volumetric space.

FIGS. 5-6 illustrate an exemplary flow chart of an implementation, such as an algorithm 600, for manipulating an object displayed on a display device assembly 502 using a gesture that transitions between a surface and a volumetric space. The algorithm 600 first senses, using a gesture sensing system such as the gesture sensing system 504, a first gesture made relative to a surface or a volumetric space adjacent to the surface (602). For example, the surface can form one of several boundaries to the volumetric space. The use of the terms first, second, and so forth anywhere herein is not intended to convey any relative temporal or spatial significance or importance but rather simply to differentiate among otherwise identical items from one another for ease of discussion. Thus, "first senses" as used herein does not mean that this step is the first, in a temporal sense, step to be carried out in the algorithm 600.

Responsive to the first sensing, the first gesture influences a first characteristic, such as a first movement, of a first object displayed on a display device assembly, such as the device display assembly 502 (604). Because the first object is a displayed item, "influences" here can mean that a movement, size, color, velocity, direction, opacity, or other characteristic of the first object is made graphically to appear to be influenced by the first gesture. This influence can occur in real time as the first gesture is being made.

The algorithm 600 second senses, using the gesture sensing system 504, a second gesture made relative to the other of the surface or the volumetric space (606). Thus, if the first gesture was made relative to the surface, the second gesture is made relative to the volumetric space. If the first gesture was made relative to the volumetric space, the second gesture is made relative to the surface. Again, the terms first and second herein do not connote any temporal or spatial order or significance. The first and second gesture can be part of a single, seamless, uninterrupted gesture formed by one or more body parts of a human or an object held or worn by the human, such as a wand or a bracelet. An example of a gesture sensing system that detects objects held by a human is the RAZER HYDRA motion-sensing gaming controller available from Sixense Entertainment, Inc. in Los Gatos, Calif.

Responsive to the second sensing, the second gesture influences a second characteristic, such as a second movement, of the first object displayed on the display device assembly or of a second object that is affected by the first characteristic or movement of the first object (608). Here the same or a different characteristic of the first object can be influenced twice, once by the first gesture and again by the second gesture. For example, the first gesture can influence a velocity (first characteristic) of the first object while the second gesture influences a direction (second characteristic) of the first object. Alternately, the second gesture can influence a second object that is affected by the changing characteristic of the first object. For example, if the first object's characteristic is a movement, the first object can hit or otherwise interact with the second object, causing a corresponding change to a characteristic, such as a movement, of the second object.

As stated above, the first gesture can be made relative to the surface and the second gesture can be made relative to the volumetric space. The first characteristic can correspond to a first movement of the object, which can correspond to a movement along a surface (such as a surface of the multi-touch sensing system 506) along which the first object travels as displayed on the display device assembly 502. The second characteristic can correspond to a second movement of the first object or the second object, which corresponds to a movement in space within which the first object or the second object travels as displayed on the display device assembly 502.

The first movement of the object as displayed on the display device of the display device assembly 502 transitions directly into the second movement as the first gesture transitions to the second gesture. This transition can occur in real time or as near to real time as to be practically visually imperceptible to the user. The term "transition directly" allows for some additional or extraneous movement in the gesture that is ignored as it moves away from the surface. In other words, the second gesture may not be picked up until after it has moved a distance away from the surface. However, when the gesture is made in a continuous, uninterrupted movement, it would be impossible for the first gesture to transition into the second gesture without the intervening slight movement in between. Alternately, when the first gesture is made by, for example, a left hand, and the second gesture is made by, for example, a right hand, there can be a slight pause in between the transition from the surface gesture made by the left hand to the air gesture made by the right hand as the user's brain adapts to switching the gesture from one side of the body to another. In other words, "transition directly" can mean there is no intervening gesture or other input that is processed between the sensing of the first gesture and the sensing of the second gesture. A characteristic of the first object as displayed on the display device assembly 502 responsive to the first gesture would continue to be displayed as if influenced solely by the first gesture until the second gesture is sensed, which causes the characteristic or another characteristic of the first object to be changed or the first object to interact with a second object in response to the second gesture.

In another example, the first gesture can be made relative to the volumetric space and the second gesture can be made relative to the surface. The first characteristic of the first object can correspond to a movement space within which the first object travels as displayed on the display device assembly 502. The second movement of the first object or the second object corresponds to a movement along a surface along which the first object or the second object travels as displayed on the display device assembly 502. The term "travels" evokes a movement, but the implementations herein are not limited to movement characteristics of objects. As discussed above, any other characteristic of an object can be changed by the "fusion" type gesture disclosed herein. This paragraph simply illustrates one example of many as to how a characteristic (here, movement) of the first object can be manipulated by the first gesture and the second gesture.

As disclosed above, the first gesture can be made by a hand or a finger of a human, and the second gesture is made by a body of the same human or another human. In two-person implementations, a first player can make the surface gesture and a second player can make the air gesture before or after the surface gesture is made. The same body part or object does not have to be involved in the first and second gestures. Different body parts can be manipulated and/or objects can be worn or held to form the first and second gestures. As noted above, in some implementations, the first gesture transitions directly into the second gesture so coordination among different humans or body parts or objects is needed to effectuate the transition or "hand-off" from one gesture to another.

The first or the second object can represent a virtual character or an avatar, and the air or surface gesture can influence or control a behavior or action carried out by the avatar, such as seek, chase, hide, or return. For example, a beckoning gesture in the volumetric space can cause the avatar to return to a desired location within a virtual environment. A first gesture on a physical surface can be used to launch the avatar into action that pursues goals on behalf of a human, such as collecting gems or treasures that are associated with randomly determined outcomes. Second gestures made in the volumetric space are then used to command or direct a behavior characteristic of the avatar once launched.

The first gesture can maintain contact with the surface as the second gesture is made. By maintaining contact with the surface, the haptic feedback device 510 can impart haptic feedback toward the surface as the second gesture is made. The body part maintaining contact by the first gesture senses the imparted haptic feedback, which can be coordinated with graphics and/or audio to provide a realistic multi-sensory experience.

A surface gesture can be a tactile gesture in which a human uses one or more body parts to physically touch the surface relative to which the surface gesture is sensed. An air gesture can be made in free space by a body part or an object held or worn by the same human who makes the surface gesture or a different human.

In implementations where the second gesture causes the first object to interact with a second object, the second object can be affected by the first movement of the first object in that a movement of the first object causes the second object to move or change. The first gesture can launch the first object according to the first movement, like a projectile or an object being thrown or tossed. The second gesture can steer the first object according to the second movement such that the first object moves in the general direction as the second movement. The steering can influence the first object's direction such that when the second gesture is moved in a left direction, the first object moves to the left.

Figure 7C:
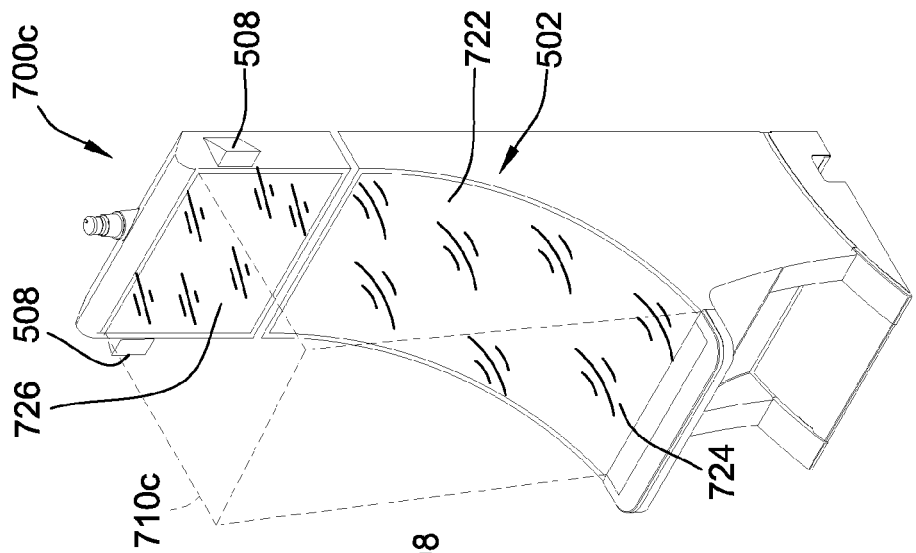
FIGS. 7A-7D illustrate perspective views of three example form factors for a gaming terminal configured to sense gestures transitioning between a surface and a volumetric space with or without an optional docking station for a portable electronic device used to sense gestures made in a volumetric space in front of the gaming terminal.
Figure 7B:
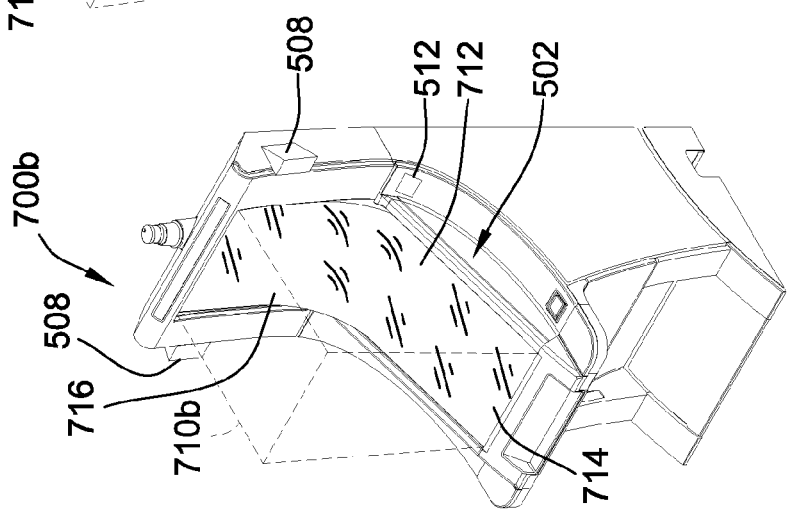
Figure 7A:
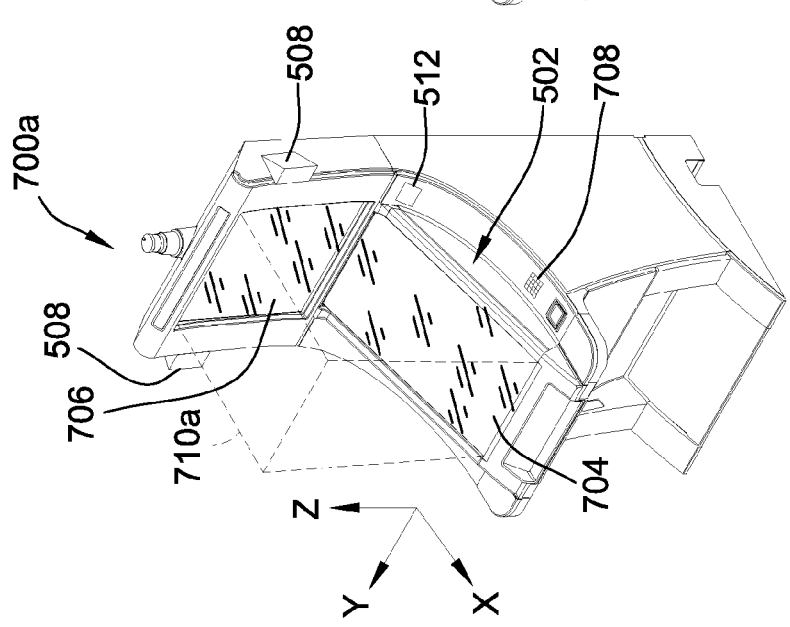

FIGS. 7A-7D illustrate four different example form factors for a gaming terminal 10 suitable for implementing aspects of the present disclosure. Each of these form factors is configured to provide a surface upon which a surface gesture can be made and a corresponding volumetric space within which an air gesture can be made. In FIG. 7A, a gaming terminal 700a, which can be based on the gaming terminal 10, is shown having a multi-faceted display device assembly 502. The display device assembly 502 includes a first display device 704 and a second display device 706. The first display device 704 and the second display device 706 are two different display devices, and the first display device 704 is oriented generally horizontally to provide the surface upon which the surface gesture is made. By "generally horizontally" it is meant that the first display device 704 can be angled toward a player of the gaming terminal 700a, such as at a 30 degree angle relative to earth. The second display device 706 can be oriented generally vertically (relative to earth). The surface of the first display device 704 can form a bottom boundary for the volumetric space 710a that is located in front of the second display device 706. The second display device 706 can form another side boundary for the volumetric space 710a. Of course, the range of detection of the one or more imaging devices 508 used to capture and detect the air gestures made in the volumetric space 710a are not so neatly confined to the volumetric spaces illustrated generally in FIGS. 7A-7C, but a "zone" of detection can be defined to capture a variety of air gestures made in front of the second display device 706 as determined by the particular application in which the gestures are used as inputs. In FIG. 7A, both the first display device 704 and the second display device 706 have generally flat surfaces, but as emphasized repeatedly herein, a surface gesture is not confined to a flat surface, as shown in FIG. 7B.

FIG. 7B shows a gaming terminal 700b, based on the gaming terminal 10, having a single, curving display device assembly 502 that has a lower portion 714 and an upper portion 716 that together form a single surface 712. The lower portion 714 is slightly angled toward the player, such as at a 30 degree angle relative to earth, and then curves to form a vertically oriented upper portion 716. A volumetric space 710b is generally shown in front of the vertically oriented upper portion 716 and is bounded on the bottom by the lower portion 714. Curved displays are available, for example, from Ostendo Technologies, Inc. that markets a CRVD display having a curved surface.

FIG. 7C shows a gaming terminal 700c, based on the gaming terminal 10, having a first, curving display device 724 having a curved surface 722 and a second display device 726 that is separate from the first display device 724. The second display device 726 has a generally flat surface and is oriented generally vertically relative to earth. A volumetric space 710c is generally shown to be bounded by the first display device 724 on the bottom and on one side by the first display device 724 and the second display device 726.

Figure 7D:
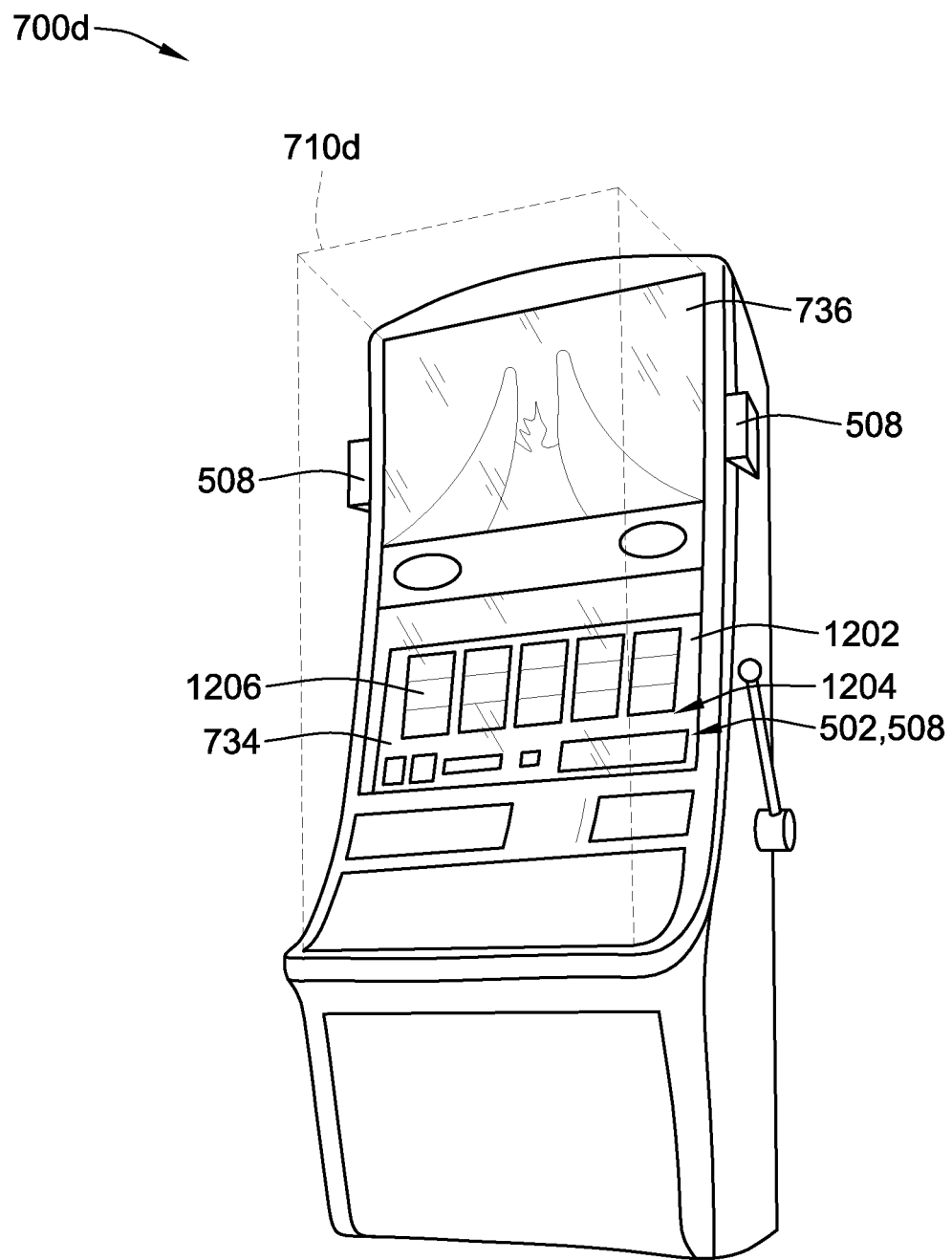

FIG. 7D shows an upright gaming terminal 700d, based on the gaming terminal 10, having transmissive display 1204, described in more detail below in connection with FIGS. 12A-12D, and a second display device 736. Overlaying the transmissive display 1204 is a touch-sensitive substrate 1202 relative to which surface gestures are made. Air gestures are detected in a volumetric space 710d generally bounded by the front of the cabinet of the gaming terminal 700d. Physical mechanical reels 1206 are displayed through the transparent layers of the touch-sensitive substrate 1202 and the transmissive display 1204. The gesture-sensing system 508 includes sensors as shown, though the location of the sensors as shown in FIGS. 7A-7D are merely illustrative and not representative of the only location in which one or more sensors for detecting air gestures can be located. An example using an upright gaming terminal 700d will be described below in more detail in connection with the sequences shown in FIGS. 12A-12D.

The gaming terminal implementations shown in FIGS. 7A and 7B feature a docking station that includes the docking station interface 512 described in connection with FIG. 4 above. The user inserts a portable electronic device 518 into the docking station, and optionally connects a power/data connector of the portable electronic device 518 to a connector of the docking station interface 512, and the portable electronic device 518 communicates coordinate information corresponding to gestures made in the volumetric space 710a, 710b to the electronic gaming terminal 700a, 700b. As stated above, the docking station interface 512 can also include a wireless interface such that the portable electronic device 518 communicates the coordinate information wirelessly to the electronic gaming terminal 700a, 700b. In this implementation, the docking station shown in FIGS. 7A and 7B is a secure location in which the portable electronic device 518 sits to capture gestures made in the volumetric space 710a, 710b.

As disclosed above, a code, such as a QR code 708, can be displayed by or on the gaming terminal 700a. As shown in FIG. 7A, the code 708 is printed as an indicia on a cabinet of the gaming terminal 700a, but the code 708 can also be displayed by one of the display devices of the display device assembly 502. The user uses the imaging device 520 on the portable electronic device 518 to capture the code 708. The code 708 points to an address where the 3D-gesture sensing application 526 is hosted by a remote server 524, and that application 526 is downloaded to the portable electronic device 518 when a link or an address corresponding to the code 708 is selected. The portable electronic device 518 uses the 3D-gesture sensing application 526 to sense gestures made in the volumetric space 710a, and the 3D-gesture sensing application 526 communicates the coordinate information corresponding to the air gestures to the gaming terminal 700a via the docking station interface 512. In such an implementation, the gaming terminal 700a can lack any functioning structure (including software) for sensing gestures in the volumetric space. In other words, air gestures made in the volumetric space are sensed by the 3D-gesture sensing application 526 operated on the portable electronic device 518.

Returning to FIG. 6, optional additional steps can be carried out in some aspects of the present disclosure. The gaming terminal 700a can receive from the portable electronic device 518 coordinates of the gesture made in the volumetric space 710a (610). The portable electronic device 518 captures a code 708 displayed on or by the gaming terminal 700a (612). A 3D-gesture sensing application 526 is downloaded to the portable electronic device 518 from the remote server 524 as indicated by the code 708 (614). For example, the code 708 can encode an address, a URL, or a link that corresponds to a location where the 3D-gesture sensing application 526 can be downloaded on the remote server 524. Gestures made in the volumetric space 710a are sensed using the downloaded 3D-gesture sensing application 526 (616). Optionally, in implementations involving a gaming terminal 10, such as the gaming terminal 700a, credits can be awarded as a function of how the first object interacts with the second object or another object (638). It should be noted that although it may appear that the first object affects which award is randomly selected, in fact the first object is already associated with the randomly determined outcome of the wagering game before the first gestures is even made. Thus, the first gesture and the second gesture have no affect on which of the outcomes is randomly determined to correspond to the randomly determined outcome.

Alternately, the method 600 can display on the display device assembly 502 multiple elements (626) related to a wagering game played on the system 500 or any other gaming terminal disclosed herein. An element as used herein can refer, for example, to a selectable element of a wagering game, where the selectable element corresponds to an outcome that is randomly selected from multiple outcomes and can be represented as a graphical symbol. Examples of elements are discussed in more detail below. The algorithm 600 can move the first object toward the elements in accordance with the first gesture and the second gesture (628). In other words, the first gesture and the second gesture control a movement characteristic of the first object. For example, the first gesture can control a velocity characteristic of the first object, and the second gesture can control a direction characteristic of the first object. The algorithm 600 causes the first object to interact with a first of the elements such that the first element corresponds to the randomly determined outcome (630). Example interactions are disclosed herein, including the first object appearing to collide, strike, hit, or overlap the first element. The first element corresponds to the randomly determined outcome, which can be revealed as an award of credits, if any. If credits are to be awarded, the algorithm 600 awards credits as a function of how the first object interacts with the second object or another object (638). As discussed above, the randomly determined outcome is already predetermined before the first gesture is made such that neither the first gesture nor the second gesture actually have any affect on the randomly determined outcome, but the graphical presentation of the first object as it is being manipulated by the first and second gestures make it appear that the gestures are influencing a characteristic, such as a movement characteristic, of the first object. In this sense, credits can be awarded as a function of how the first object interacts with the second object or another object (such as the first element). The number of awards or whether any credits are to be awarded at all has already been randomly predetermined prior to the first gesture being sensed.

Alternately, the algorithm 600 can display an array of symbol positions (632), such as symbol positions in an array of reel symbols for a slot-type wagering game. A symbol (corresponding to a first object as used herein) is moved toward the array according to the first gesture (634). For example, as the symbol moves toward the array, the first gesture manipulates in the volumetric space a direction of the symbol so that the first gestures affects and changes a corresponding direction of the symbol. The symbol is moved within a selected symbol position on the array according to the second gesture (636). Here, the symbol can arrive at a certain symbol position in the array and be positioned there by the second gesture, which can be made as a tactile touch to a surface of a gesture-sensing system 504. This aspect is discussed in more detail in connection with FIGS. 9A-9M below.

Alternately, the algorithm 600 can display an empty or partially empty pick field with pick locations to be populated by selectable elements in accordance with "fusion" gestures according to aspects disclosed herein (618). The first object is guided via a first movement toward the pick field (620). Using a second gesture that moves the first object according to a second movement, the first object is populated in a selected pick location in the pick field (622). The algorithm 600 displays the first object at the selected pick location in the pick field (624). This aspect is discussed in more detail in connection with FIGS. 10A-10J below.

FIGS. 8A-8H and 8K-8M illustrate various sequences of a gesture made and how objects displayed on one or more display devices are manipulated as the gesture transitions from a surface gesture to an air gesture. These sequences are exemplary only, and are intended to be illustrative of the examples described and shown above in the preceding figures.

In FIG. 8A, a first gesture position 802 is represented in phantom lines to show the original position of the start of a gesture in a sequence 800 that shows only a body part (depicted as a hand) making the gesture. The second gesture position 804 shows that a gesture was made in the direction of the arrow shown. The sequence 820 shown in FIG. 8C illustrates the corresponding gesture and the two gesture positions 802, 804 from the side view to indicate that a hand or finger forming the gesture is making tactile contact with a surface of the multi-touch sensing system 506, which as indicated above, can be a single touch-sensing system 506. A first object 816, depicted as a bowling ball, is graphically displayed in a sequence 810 as it is displayed on the display device assembly 502. The bowling ball 816 is animated so that it moves from the first gesture position 802 to the second gesture position 804 as if the player is winding up to release the bowling ball 816. The gesture mimics or approximates this winding up action by having the player move the gesture toward the player's body. The tactile gesture on the surface is made relative to the single- or multi-touch sensing system 506. Coordinate systems in X, Y, and Z dimensions are also shown with each sequence to indicate the orientation and spatial position of the gestures, display devices, and objects displayed on the display devices.

In the sequences 830, 840, 850 shown in FIGS. 8D-8F, the player makes a first gesture with a finger or a hand to release the bowling ball 816. Here, the finger or hand transitions from the second gesture position 804 to a third gesture position 832. An array of graphical elements 844 are shown on the display device assembly 502, and in this example, are depicted as a conventional arrangement of bowling pins. As shown in the sequence 850, the player's hand or finger maintains tactile contact with the surface of the multi-touch sensing system 506 as the hand or finger transitions from the second gesture position 804 to the third gesture position 832. Note that the hand or finger backtracks over the same surface area between the first and second gesture positions 802, 804 and the second and third gesture positions 804, 832. Characteristics of the gesture between the second and third gesture positions 804, 832 can be determined, including the velocity and pressure of the gesture. The velocity can be used to determine how fast to release the bowling ball 832 when the player's finger or hand leaves the surface of the multi-touch sensing device 506. The object here is for the player to launch the bowling ball 816 using a gesture made relative to the surface of the multi-touch sensing system 506, where at least the direction of the launch by the surface gesture indicates a trajectory of the bowling ball 816, and optionally a speed or velocity of the surface gesture indicates how fast the bowling ball 816 travels down the lane toward the elements 844. The faster the player gestures, the less time the player has to make adjustments to the trajectory of the ball as it travels down the lane, as will be discussed in connection with the next sequences.

The sequences 860, 870, and 880 shown in FIGS. 8G, 8H, and 8J, illustrate how the first surface gesture transitions to a second air gesture. This can best be seen in the sequence 880 in which the player's hand is leaving the surface of the multi-touch sensing system 506 and entering the volumetric space, such as the volumetric space 710a, 710b, 710c. Here, the hand or finger of the player transitions from the third gesture position 832 to a fourth gesture position 882, and as shown in the sequence 880, between these two gesture positions 832, 882, the player's hand has left the surface of the multi-touch sensing system 506 and entered into the volumetric space 710. As a result, the bowling ball 816 is graphically shown to have been released, such that the hand shown in the sequence 870 is no longer graphically portrayed as gripping the bowling ball 816. Now, the bowling ball 816 travels unaided down the bowling alley that is graphically depicted on the display device assembly 502. The "fusion" gesture of the present disclosure advantageously allows the player to make adjustments to the trajectory of the bowling ball 816 that violate the laws of physics. One often sees at bowling alleys players contorting their bodies after they have released a bowling ball as if the contortions will have some effect on the trajectory of the ball. Of course, in real life, such bodily contortions are totally futile. However, in the present disclosure, it is possible to change the trajectory of the ball mid-flight as it travels unaided toward the elements 844.

In the sequences 884, 894, 896 shown in FIGS. 8K-8M, the player's hand is in the volumetric space 710, but now the player moves the hand from the fourth gesture position 886 to a fifth gesture position 888 in the volumetric space. In the coordinate system shown, this gesture is made in the X-direction a distance above the surface along a Z-axis. The first through third gesture positions are made along the Y-axis. The normal trajectory 890 of the bowling ball 816 if it follows all laws of physics is shown by the dashed line and is predestined to strike the element 844a. However, because the player has made a gesture from the fourth to fifth gesture positions 886, 888, the trajectory of the bowling ball 816 is altered to follow an intended trajectory 892 that differs from the normal trajectory 890, and now the ball is intended to strike element 844b instead of element 844a. Note that the gesture direction and the affected direction of the bowling ball 816 correspond to one another such that an air gesture motioned toward the left (from the perspective of the player) also causes the bowling ball 816 to begin to veer to the left. Of course, the player can make further adjustments using air gestures to the trajectory of the bowling ball 816 as it travels down the alley until it collides with the bowling pins 844, and how much time the player has to make such adjustments can be in part a function of the velocity with which the player released the bowling ball 816 in the second to third gesture positions 832, 882. By gesturing in the Z-direction, the player can affect the speed of the bowling ball 816, thereby slowing it down or speeding it up as it travels toward the elements 844.

The bowling ball 816 is made to appear to make a seamless transition between a first display device or portion, such as the display device or portion 704, 714, 724, and a second display device or portion, such as the display device or portion 706, 716, 726. When the bowling ball 816 interacts with one of the elements, such as the element 844b depicted as a bowling pin, such as by striking or hitting the bowling pin 844b, the bowling pin can be animated to react to being struck by falling down. Optionally, in implementations that incorporate a gaming terminal, such as the gaming terminal 10 or 700a, 700b, 700c, a number of credits can be awarded to the player for striking down the pin 844a. The number of credits was already randomly determined from among multiple outcomes prior to the first gesture being made.

As mentioned above, one of the player's hands, such as the other hand that is not making the air gesture, can maintain tactile contact with the multi-touch sensing surface. When the bowling ball 816 strikes the pin 944b, the haptic feedback device 510 can impart a vibration pattern to the surface of the multi-touch sensing surface to simulate the sensation of a pin being knocked over. Haptic feedback to other parts of the player's body can also be imparted, such as if the player is seated at a chair, the chair can include haptic feedback devices that impart vibration patterns to various parts of the player's body. Audio sounds can be played through the audio speakers 16 to coincide with a theme of the game being played. In this example, the sound of a bowling ball striking a pin can be played through the audio speakers 16 as the bowling ball 816 strikes the pin 944b and knocks it down. Corresponding audio sounds can be made as the air gesture is being made to indicate that the ball's speed and/or direction is changing as it travels down the bowling lane. Likewise, haptic feedback can be imparted by the haptic feedback device 510 as the player is making corrections to the ball's trajectory and speed using air gestures such that the haptic feedback is indicative of the changes in the ball's speed and/or direction.

The sequences 900, 910, 920 shown in FIGS. 9A-9C illustrate how a further surface-to-air gesture affects objects displayed on the display device assembly 502. In this example, a first gesture starts in a first gesture position 902 and transitions to a second gesture position 904. The first gesture maintains tactile contact with the surface of the multi-touch sensing system 506 between the first gesture position 902 and the second gesture position 904. A first object 908, depicted as a set of cards, is graphically portrayed as being tossed or thrown by the player toward an upper display device or display portion, such as the display device or portion 706, 716, 726. An empty array 906 is also graphically shown. This array 906 will be populated with symbols from the set of cards 908 to form multiple reels each bearing multiple symbols. The idea here is that the player uses a "fusion" gesture to control how the array 906 is populated with the symbols corresponding to the set of cards 908, as will be described in connection with the next sequences.

As indicated by the arrow in the sequence 920, the player's hand is about to leave the surface of the multi-touch sensing system 506 to transition from the first gesture to a second gesture in the volumetric space 710a, 710b, 710c. In the next sequences 930, 940, 950, the player's hand is shown at a third gesture position 932 in the volumetric space 710a, 710b, 710c, which can be seen best in the sequence 950. The player's hand has now moved from the second gesture position 904 to a third gesture position 932, which is now a distance above (along the Z-axis) the surface of the multi-touch sensing system 506. The imaging device 508 senses the gesture made by the hand and converts the gestures into corresponding coordinate information that is passed to the CPU 30. When the player's hand leaves the surface of the multi-touch sensing system 506, the cards 908 are graphically animated to appear to have been flung or tossed up into the air toward a funnel 944 that will permit one card at a time to pass through the funnel 944. A first card 942 of these cards 908 is poised to pass through the funnel 944. Here is where the air gesture becomes involved to guide the first card 942 toward a desired location in the array 906, as will be described in connection with the next set of sequences. Note in the sequence 950, the player's hand is positioned in the volumetric space 710a, 710b, 710c a distance above the surface of the multi-touch sensing device 506. The hand in the sequence 930 has been shown from the top perspective for ease of illustration. The sequence 930 is not intended to represent a top view (looking down from the Y-axis), but rather a diagrammatic representation of the hand position relative to the surface of the multi-touch sensing device 506.

The sequences 930, 940, 970 in FIGS. 9G, 9H, and 9J show how an air gesture (a second gesture that transitions directly from the first gesture) in the volumetric space 710a, 710b, 710c affects a trajectory of the first card 942 as it travels toward one of the symbol positions 906a of the array 906. In this example, the first card 942 has passed through the funnel 944 and is traveling toward the array 906. Normally, the first card 942 would travel in a straight line as soon as it leaves the funnel 944 toward the array 906. However, the player can change or modify the trajectory of the first card 906 by making an air gesture in the volumetric space 710a, 710b, 710c in a direction indicated by the arrow shown in the sequences 930, 970.

Now, instead of the first card 942 traveling straight out of the funnel 944, the trajectory of the first card 942 is changed so that the first card 942 travels in a left direction (along the X-axis) from the perspective of the player viewing the display device assembly 502 and settles in the symbol position 906a of the array 906. This second gesture is made by moving the hand from the third gesture position 932 to a fourth gesture position 962 shown in FIGS. 9G and 9J. This allows the player to judiciously and strategically populate the array with wagering-game symbols (represented in this example by playing cards having corresponding values and suits), which will be used to form an array 906 of reels bearing these symbols. The air gesture in the volumetric space is sensed by the imaging device 508 of the gesture sensing system 504 as described above.

Next, a third gesture made in the volumetric space is shown in the sequences 980, 986, 990 of FIGS. 9K-9M. The next card 988 has passed through the funnel 944, so the player forms a third gesture by moving a hand in a right direction (along the X-axis) from the fourth gesture position 962 to a fifth gesture position 984. This causes the second card 988 to alter its normal trajectory from a straight direction to veer to the right so that it now travels to a second symbol position 906b of the array 906. The player can optionally touch the surface of the multi-touch sensing device 506 to confirm the placement of the second card 988 in the second symbol position 906b. Optionally still, the player can drag the second card 988 from the second symbol position 906b to another symbol position once it has come to rest in the second symbol position 906. Note that the funnel 944 is split between the lower and upper portions of the display device assembly 502 in a seamless manner such that visually the funnel 944 appears as a continuous structure when the first portion 704, 714, 724 and the second portion 706, 716, 726 are abutting one another or form a continuous surface such as shown in the implementation of FIG. 7B.

The sequences 1000, 1004, 1009 shown in FIGS. 10A-10C illustrate a gesture that starts in the volumetric space and transitions to a surface gesture. Here, the hand starts at a first gesture position 1002 shown in FIG. 10A within the volumetric space 710a, 710b, 710c. Objects 1006 are shown in a second portion 706, 716, 726 of the display device assembly 502, and in this example, resemble asteroids that appear to be flying toward the player along the Y-axis. An empty pick field 1008 is shown on the first portion 704, 714, 724 of the display device assembly 502. The term "pick field" is used herein as understood by those of ordinary skill in the art of wagering games. Each of at least some of the "asteroids" will become selectable elements on the pick field 1008 when populated according to this example.

In the sequences 1010, 1016, 1020 shown in FIGS. 10D-10F, the player desires to select a first asteroid 1006a of the asteroids 1006 flying toward the player as depicted graphically by an animation displayed on the display device assembly 502. The player makes a first gesture by moving the hand from the first gesture position to a second gesture position 1012 as shown in FIGS. 10D and 10F. The imaging device 508 converts the first gesture into corresponding coordinate information, and the CPU 30 uses the coordinate information to determine which of the objects 1006 the gesture would select if it continued along a trajectory that intersected with the first object 1006a. In this manner, the player need not actually reach all the way to touch the second portion 706, 716, 726 of the display device assembly 502, although in other implementations, the player can touch a location on the second portion 706, 716, 726 corresponding to the first object 1006a that is graphically displayed thereon.

In the sequences 1030, 1040, 1050 shown in FIGS. 10G, 10H, and 10J, a second gesture is made from the second gesture position 1012 to a third gesture position 1032 on the surface of the multi-touch sensing system 506. In these sequences, the gesture has transitioned from an air gesture in the volumetric space 710a, 710b, 710c, to a surface gesture that makes tactile contact with the surface of the multi-touch sensing system 506. The point of contact corresponds to a first pick location 1006a of the pick field 1006, and the second gesture guides the asteroid corresponding to the first object 1008a to that first pick location 1006a. As the second gesture is made, the first object 1006a is graphically displayed on the display device assembly 502 as being dragged along a path corresponding to the second gesture until it comes to rest in the first pick location 1006a in response to the second gesture making tactile contact with the surface of the multi-touch sensing system 506. The other pick locations can be populated in a similar manner until all of the pick locations have been populated with asteroids. Each asteroid can have a different size, where the size is indicative of a type of award or a size of an award associated with each of the objects 1006. Once the pick field 1008 has been populated, outcomes can be randomly associated with each of the objects 1006, and a wagering game can be conducted on the gaming terminal, such as the gaming terminal 10, 700a, 700b, 700c.

In the sequences shown in FIGS. 11A-11H and FIG. 11J, an air-to-surface gesture is shown affecting objects displayed relative to a surface on which the surface gesture is made as a hand making the air gesture is brought toward the surface. In this example, the objects are made to appear to scatter as if trying to escape from the path of the hand as it is brought closer to the surface. In the sequence 1100, 1120 shown in FIGS. 11A and 11C, the hand starts at a first gesture position 1102 in the volumetric space 710a, 710b, 710c a distance above (along the Z-axis) the surface of the multi-touch sensing system 506. The display device assembly 502 displays objects 1114, here depicted as bugs, milling about. A movable object 1112 is also displayed, which can be manipulated by air gestures made in the volumetric space 710a, 710b, 710c. In the sequence 1130 shown in FIG. 11D, the player's hand is moved down and slightly to the right (down the Z-axis and to the right along the X-axis) and slightly away from the second portion 706, 716, 726 (along the Y-axis) of the display device assembly 502 from the first gesture position 1102 to a second gesture position 1132. Coordinate information corresponding to this first gesture is determined by the imaging device 508 of the gesture sensing system 504 as described above. On the display device assembly 502, the movable object 1112 is graphically animated to track the gesture as if being pulled or manipulated by the first gesture as the gesture moves through the volumetric space 710. The objects 1114 start to grow fidgety and begin to try to move away from the intended trajectory of the movable object 1112. The movable object 1112 can graphically transition from the second portion 706, 716, 726 to the first portion 714, 714, 724 of the display device assembly 502 as the second gesture manipulates the movable object 1112 toward the objects 1114 displayed relative to the surface of the multi-touch sensing system 506.

In the sequences 1144, 1150, 1160 shown in FIGS. 11G, 11H, and 11J, a second gesture is made from the second gesture position 1132 to a third gesture position 1146 on the surface of the multi-touch sensing system 506, such that the hand makes tactile contact with the surface. Here, the player has brought the movable object 1112 to a first object 1114a of the objects. Graphically, this can be shown as an asteroid 1112 squashing the bug 1114a. In this manner, the first object 1114a can be selected or an associated award of credits can be awarded to the player. As can be seen from the sequences 1150, 1160 shown in FIGS. 11H and 11J, the objects 1114 are animated to appear to be scattering away from the impending movable object 1112 such that the first gesture in the volumetric space 710 affects a movement characteristic of multiple objects in a manner that is consistent with how those objects would behave if they could escape from a falling object or an object that was about to destroy one of them. The player's hand acts as a sort of Hand of God, meting out one of the objects 1112 for whatever fancies its new master. In a wagering game context, the object 1112 can be associated with an award of credits or a wagering game feature that is revealed or made available to the player when the second gesture touches a location on the multi-touch sensing system 506 corresponding to the object 1112 displayed on the display device assembly 502.

Figure 12A:
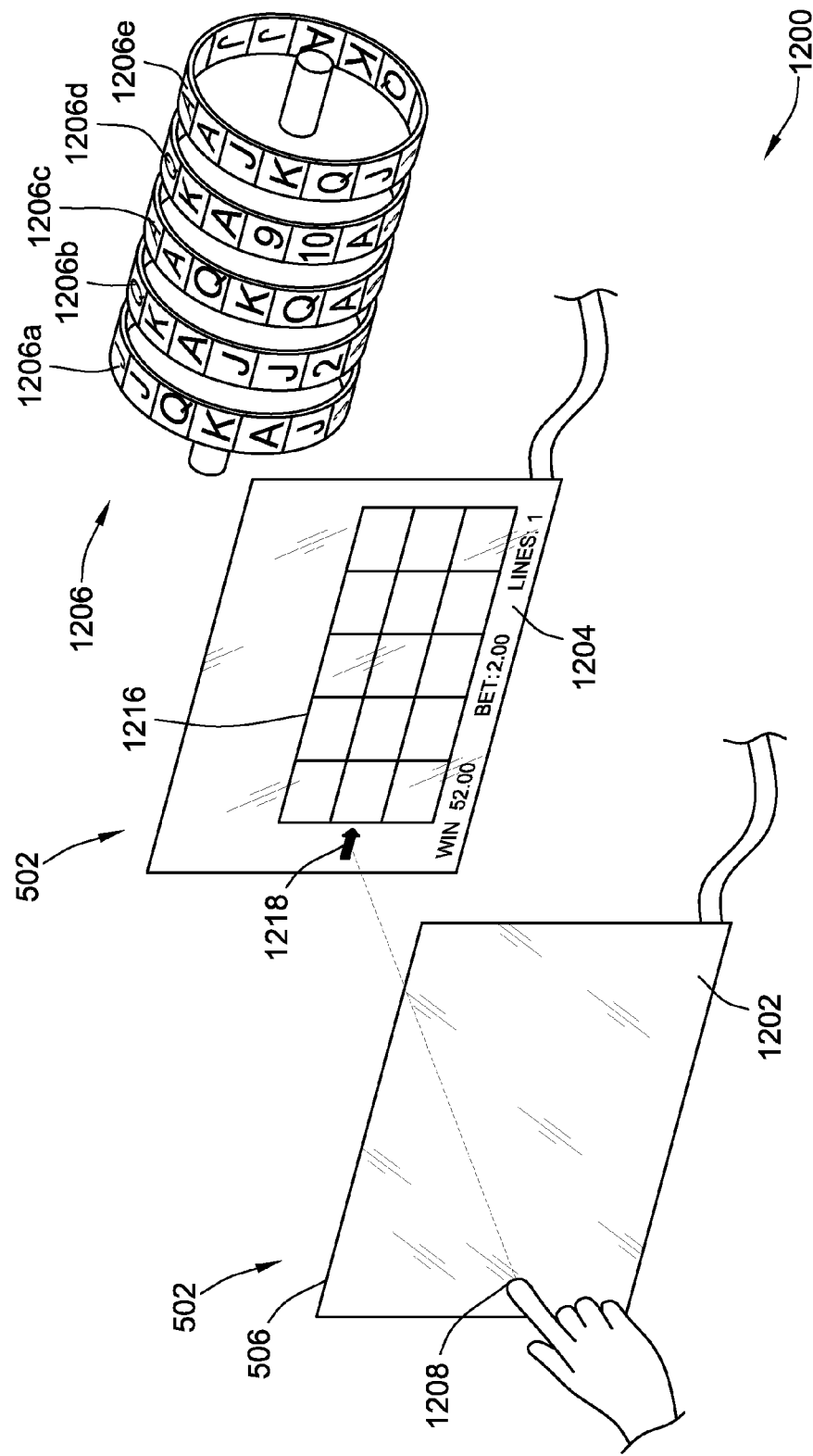

FIGS. 12A-12D are illustrations of sequences for using a surface and an air gesture to manipulate a virtual object and a physical object. In FIG. 12A, a sequence 1200 includes an upright gaming terminal 1210, which can be based on any gaming terminal disclosed herein, such as the gaming terminal 700d shown in FIG. 7D, having a gesture sensing system 504 that includes the transparent touch-sensitive substrate 1202, and a display device assembly 502 that includes a transmissive display device 1204. The gaming terminal 1210 includes physical mechanical reels (designated generally by reference number 1206) having multiple strips of reels (five shown in this example) each bearing symbols that form together with other symbols on other reels different randomly selected outcomes of a wagering game. The transmissive display 1204 is conventionally transparent or semi-transparent to permit a player to see the physical mechanical reels 1206 through the transparent substrate of the transmissive display 1204. The transparent touch-sensitive substrate overlays the transmissive display 1204 to receive single- or multi-touch gestures relative to its physical surface. Although the touch-sensing system is shown in FIG. 12D as a touch-sensitive substrate 1202, in other aspects, an imaging device can be used to detect gestures made relative to a physical surface, such as a surface of the transmissive display 1204, thereby eliminating the touch-sensitive substrate 1202. Each layer added over the transmissive display 1204 increases its opacity and makes it harder to see the mechanical reels 1206.

In FIG. 12A, a player's hand is positioned at a first gesture position 1208, making contact with a physical surface of the touch-sensitive substrate 1202 of the multi-touch sensing system 506. An array 1216 is displayed on the transmissive display 1204, and a graphical indicium, here shown as an arrow, 1218 is also displayed on the transmissive display 1204 corresponding to the location of the first gesture position 1208 on the touch-sensitive substrate 1202. Five mechanical reels 1206a-e are shown behind (from the perspective of the viewer) the transmissive display 1204 so that they are viewed through the transparent transmissive display

1204. The mechanical reels 1206*a-e* are free to spin independently and can be made to stop independently of one another under control of the CPU 30. In FIG. 12A, the mechanical reels are made to physically spin, and the spinning motion of the reels can be seen through the transmissive display 1204.

In FIG. 12B, the player makes a first gesture by sliding the hand or finger across the physical surface of the touch-sensitive substrate 1202 from the first gesture position 1208 toward a second gesture position 1214 to form the first (surface) gesture. The graphical indicium, which started as the arrow 1218, is animated to correspond to the movement of the first gesture. In the example shown in FIG. 12B, the graphical indicium 1212 is shown as a line that extends lengthwise as the finger or hand is slid from the first gesture position 1208 to the second gesture position 1214. As the finger or hand traverses one of the mechanical reels 1206*a,b,c,d,e* from left to right, the spinning mechanical reel 1206*a* first comes to a stop as if dragging the finger across the surface above the mechanical reel 1206*a* caused it to stop. In this manner, the surface gesture appears to affect a characteristic (here, movement) of a physical object (here, a mechanical reel 1206*a*). A graphical indicium 1212 is also displayed concurrently with the gesture to complete the illusion. In this example, the graphical indicium 1212 can resemble a stop stick that appears to interact or interfere with the spinning motion of the mechanical reels 1206. Thus, as the finger or hand slides across each of the mechanical reels 1206*a,b,c,d,e* from left to right, each reel 1206*a,b,c,d,e* comes to a stop as the body part traverses a physical surface above each reel 1206*a,b,c,d,e*. In FIG. 12B, four of the physical reels 1206*a,b,c,d* have stopped, and the body part is about to make the last reel 1206*e* stop. In FIG. 12C, the body part has now traversed across the entire width of the physical reels 1206 at a surface above the reels 1206, causing the last reel 1206*e* to stop. The graphical indicium 1212 is extended across all of the reels 1206 as shown. The first gesture ends at an ending gesture position 1222 to complete the surface gesture. Thus, it appears to the player as if the surface gesture, starting at the first gesture position 1208 and ending at the ending gesture position 1222 on the surface of the touch-sensitive substrate 1202, has caused each of the spinning mechanical reels 1206*a,b,c,d,e* to stop.

Now, in FIG. 12D, the player removes the hand or finger from physical contact with the touch-sensitive substrate 1202 and makes a second (air) gesture starting at a first gesture position 1232 and ending at a second gesture position 1234. In the example shown, the player makes the second gesture in a volumetric space 710*d* in front of the gaming terminal 1210, which is detected by the imaging device 508. Here, the third mechanical reel 1206*c* has already come to a stop, but in response to the second gesture being made and detected by the gesture-sensing system 504, the CPU 30 causes the third mechanical reel 1206*c* to nudge the reel one position so that a different symbol appears in the array 1216 (in the illustrated example, the symbol Q is replaced by the symbol K in the array position 1216*a*). In this manner, the second gesture in the volumetric space 710*d* by the player appears to influence a characteristic (e.g., movement) of the physical mechanical reel 1206*c*.

Although specific examples are shown and described above in connection with the various sequences, the present disclosure is hardly limited to these specific examples. The air-to-surface and surface-to-air gestures disclosed herein can be coordinated with graphics displayed on one or more displayed devices and optionally haptic and/or audio feedback in numerous ways. For example, a first surface gesture can be used to launch an object, such as a plane, and then a second air gesture can be used to steer that object in flight in volumetric space to adjust the characteristics of the object, such as speed or direction. The object can be steered or guided or otherwise manipulated by air gestures toward a target or other graphical element, and in implementations involving wagering games, the graphical element can be associated with a wagering game feature or an award of credits or can unlock further wagering game features of a wagering game, including a primary wagering game, a bonus wagering game, a community wagering game, a progressive wagering game, and the like. The object itself can be multi-faceted or three-dimensional and rendered on the display as a 3D object, and air gestures can be made to rotate or spin the object in three dimensional space, while a surface gesture can be used to move the object along a surface or to select the object or cause the object to interact with another object. The multi-touch gesture-sensing system can have a relatively high resolution to capture fine motor gestures made relative to a surface while the imaging device can have a relatively lower resolution to capture gross motor gestures made in volumetric space. Objects that require finer motor control can be manipulated on the surface while other controls for which gross motor functions are sufficient can be provided in the volumetric space. In wagering game implementations, the player's ability to manipulate objects creates the impression in the player that the player can affect the outcome, even if in reality the outcome has already been randomly predetermined as soon as the wager is received and before the player makes any gesture.

Each of FIGS. 5-6, described by way of example above, represents one or more algorithms that correspond to at least some instructions executed by the CPU 30 and/or external systems 48 in FIGS. 2 and 5 to perform the above described functions associated with the disclosed concepts. Any of the methods described herein can include machine or computer-readable instructions for execution by: (a) a processor, (b) a controller, such as the CPU 30 or external systems 48, and/or (c) any other suitable processing device. Any algorithm, software, or method disclosed herein can be embodied as a computer program product having one or more non-transitory tangible medium or media, such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.).

It should be noted that the algorithms illustrated and discussed herein as having various modules or blocks that perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the scope of the invention as defined in the appended claims.

What is claimed is:

1. A method of manipulating a visual object being displayed on a gaming machine primarily dedicated to playing at least one casino wagering game, the gaming machine including a gaming cabinet, one or more electronic display devices coupled to the gaming cabinet, and a gesture-sensing system including a touch-sensitive surface and a motion sensor, the method comprising:

generating one or more random elements with a random element generator;

determining, by at least one of one or more controllers, an outcome of the casino wagering game based, at least in part, on the one or more random elements;

sensing, by the gesture-sensing system, a continuous gesture that includes a contact component and a non-contact component, the contact component including contact with the touch-sensitive surface, the non-contact component including motion within the designated volumetric space, the contact and non-compact components transitioning directly from one to the other;

in response to sensing the contact component, visually modifying, by at least one of the one or more controllers, a characteristic of at least a first object displayed on at least one of the one or more electronic display devices;

in response to sensing the non-contact component, visually modifying, by at least one of the one or more controllers, at least one of a characteristic of the first object and a characteristic of a second object displayed on at least one of the one or more electronic display devices; and awarding, by at least one of the one or more controllers, an award in response to the outcome and the visual modifications meeting a predetermined award criteria.

2. The method of claim 1, wherein the contact component visually modifies a characteristic of the first object and the non-contact component visually modifies the same characteristic of the first object in a different way.

3. The method of claim 1, wherein the contact component of the continuous gesture precedes the non-contact component.

4. The method of claim 1, wherein the non-contact component of the continuous gesture precedes the contact component.

5. The method of claim 1, wherein either the contact or the non-contact component causes the first object to visually separate from a plurality of objects and the other of the contact or non-contact components causes the first object to visually move in a particular direction.

6. The method of claim 1, wherein the one or more electronic display devices include a primary display device and a secondary display device, the primary display device including a touch-sensitive surface, and wherein either the contact component or the non-contact component causes the first object to move about the primary display device and the other of the contact or non-contact component causes the first object to move about the secondary display device.

7. The method of claim 1, wherein either the contact component or the non-contact component causes a plurality of objects, including the first object, to visually disperse across at least one of the one or more electronic display devices, and wherein the other of the contact or the non-contact component causes the first object to visually move in a particular direction.

8. The method of claim 1, wherein at least one of the one or more electronic display devices includes an plurality of mechanical reels, wherein the contact component visually modifies the plurality by at least one of starting and stopping spinning of the plurality, and wherein the non-contact component visually modifies some but not all of the plurality by at least one of starting and stopping the some but not all of the plurality.

9. The method of claim 1, wherein either the contact or the non-contact component launches an avatar to pursue a goal in the casino wagering game, and wherein the other of the contact or the non-contact component directs further action by the avatar in pursuit of the goal.

10. The method of claim 1, wherein the contact component causes a first movement of the first object and the non-contact component causes a second movement of the first object that is different from the first movement.

11. The method of claim 1, wherein visually modifying the characteristic of the first object causes a corresponding visual modification of a second object.

12. The method of claim 1, wherein either the contact or non-contact component visually modifies a velocity of the first object, and wherein the other of the contact or non-contact component visually modifies a direction of the first object.

13. The method of claim 1, wherein the contact component includes contact by a hand or finger and the non-contact component includes movement of another body part or of a device worn or held by a user.

14. A gaming machine primarily dedicated to playing at least one casino wagering game, the gaming machine comprising:

a gaming cabinet;

one or more electronic display devices;

an electronic gesture-sensing system coupled to the gaming cabinet, the gesture-sensing system configured to sense a continuous gesture that includes a contact component and a non-contact component, the contact component including contact with a touch-sensitive surface, the non-contact component including motion within a designated volumetric space, the contact and non-compact components transitioning directly from one to the other;

a random element generator configured to generate one or more random elements; and one or more controllers configured to:
determine an outcome of the casino wagering game based, at least in part, on the one or more random elements;

in response to sensing, by the gesture-sensing system, the contact component of the continuous gesture, visually modify a characteristic of at least a first object displayed on at least one of the one or more display devices;

in response to sensing, by the gesture-sensing system, the non-contact component of the continuous gesture, visually modify at least one of a characteristic of the first object and a characteristic of a second object displayed on at least one of the one or more electronic display devices; and award an award in response to the outcome and the visual modifications meeting a predetermined award criteria.

15. The gaming machine of claim 14, wherein the contact component causes a first movement of the first object and the non-contact component causes a second movement of the first object that is different from the first movement.

16. The gaming machine of claim 14, wherein the gesture-sensing system includes a portable electronic device having a controller configured to sense the non-contact component in the designated volumetric space, and to communicate coordinate information corresponding to the non-contact component to at least one of the one or more controllers.

17. The gaming machine of claim 14, wherein the one or more electronic display devices include a primary display device and a secondary display device, the primary display device including the touch-sensitive surface, and wherein the contact component causes the first object to move about the primary display device and the non-contact component causes the first object to move about the secondary display device.

18. The gaming machine of claim 14, wherein the visual modification of the characteristic of the first object causes a corresponding visual modification to a second object.

19. The gaming machine of claim 14, wherein the first object is a first symbol and the one or more controllers are further configured to cause the one or more electronic display devices to display an array of symbol positions, wherein either the contact or non-contact component causes the first symbol to move towards the array and wherein the other of the contact or non-contact component causes the first symbol to move to a selected symbol position in the array.

20. The gaming machine of claim 14, wherein either the contact component or the non-contact component causes a plurality of objects, including the first object, to visually disperse across at least one of the one or more electronic display devices, and wherein the other of the contact or the non-contact component causes the first object to visually move in a particular direction.

21. The gaming machine of claim 14, wherein either the contact or non-contact component visually modifies a velocity of the first object, and wherein the other of the contact or non-contact component visually modifies a direction of the first object.

22. The gaming machine of claim 14, wherein the designated volumetric space is bounded on at least one border by the one or more display devices.

23. The gaming machine of claim 14, wherein the touch-sensitive surface is a multi-touch sensing surface configured to sense multiple touches to the sensing surface simultaneously, and wherein gesture-sensing system further includes at least one imaging device configured to sense gestures made within the designated volumetric space.

24. A gaming system primarily dedicated to playing at least one casino wagering game, the gaming system comprising:
   a gaming machine including a gaming cabinet, one or more electronic display devices coupled to the gaming cabinet, and a gesture-sensing system including a touch-sensitive surface and a motion sensor, the gesture-sensing system being configured to sense a continuous gesture and to distinguish between a contact component and a non-contact component of the continuous gesture, the contact component including contact with the touch-sensitive surface, the non-contact component including motion within a designated volumetric space sensed by the motion sensor, the gesture-sensing system being coupled to the gaming cabinet;
   a random element generator configured to generate one or more random elements;
   one or more controllers configured to:
      determine an outcome of the casino wagering game based, at least in part, on the one or more random elements;
      in response to sensing, by the gesture-sensing system, the contact component of the continuous gesture, visually modify a characteristic of at least a first object displayed on at least one of the one or more display devices;
      in response to sensing, by the gesture-sensing system, the non-contact component of the continuous gesture, visually modify at least one of a characteristic of the first object and a characteristic of a second object displayed on at least one of the one or more electronic display devices; and
      award an award in response the outcome and the visual modifications meeting a predetermined award criteria.

25. The gaming system of claim 24, wherein the gesture-sensing system includes a portable electronic device having a controller configured to sense the non-contact component in the designated volumetric space, and to communicate coordinate information corresponding to the non-contact component to at least one of the one or more controllers.

26. The gaming system of claim 25, wherein the portable electronic device includes an imaging device that images gestures in the designated volumetric space.

27. The gaming system of claim 24, wherein the gesture-sensing system includes a portable electronic device connected for communication to a remote server via a communications network, the remote server downloading three-dimensional gesture-sensing software to the portable electronic device and the portable electronic device executing the three-dimensional gesture-sensing software to process and communicate coordinate information corresponding to the non-contact component within the designated volumetric space to at least one of the one or more controllers.

28. The gaming system of claim 24, wherein the non-contact component causes the first object to visually separate from a plurality of objects and the contact component causes the first object to visually move in a particular direction.

29. The gaming system of claim 24, wherein the contact component causes a plurality of objects, including the first object, to visually disperse across at least one of the one or more electronic display devices, and wherein the non-contact component causes the first object to visually move in a particular direction.

30. The gaming system of claim 24, wherein at least one of the one or more electronic display devices includes an plurality of mechanical reels, wherein the contact component visually modifies the plurality by at least one of starting and stopping spinning of the plurality, and wherein the non-contact component visually modifies some but not all of the plurality by at least one of starting and stopping the some but not all of the plurality.

31. The gaming system of claim 24, wherein either the contact or the non-contact component launches an avatar to pursue a goal in the casino wagering game, and wherein the other of the contact or the non-contact components directs further action by the avatar in pursuit of the goal.

32. The gaming system of claim 24, wherein the touch-sensitive surface is a multi-touch sensing surface configured to sense multiple touches to the sensing surface simultaneously, and wherein the gesture-sensing system further includes at least one imaging device configured to sense gestures made within the designated volumetric space.

* * * * *